(12) United States Patent
Jurick et al.

(10) Patent No.: US 11,704,758 B2
(45) Date of Patent: Jul. 18, 2023

(54) SYSTEM, METHOD, AND COMPUTER PROGRAM PRODUCT FOR SITING A LAND PARCEL

(71) Applicant: Michael Baker International, Inc., Pittsburgh, PA (US)

(72) Inventors: Jeremy Scott Jurick, Beaver, PA (US); Richard Arthur Kammer, Jr., Freedom, PA (US)

(73) Assignee: Michael Baker International, Inc., Pittsburgh, PA (US)

( * ) Notice: Subject to any disclaimer, the term of this patent is extended or adjusted under 35 U.S.C. 154(b) by 219 days.

(21) Appl. No.: 17/011,022

(22) Filed: Sep. 3, 2020

(65) Prior Publication Data

US 2022/0067856 A1 Mar. 3, 2022

(51) Int. Cl.
*G06Q 50/16* (2012.01)
*G06F 16/29* (2019.01)

(52) U.S. Cl.
CPC .......... *G06Q 50/165* (2013.01); *G06F 16/29* (2019.01); *G06Q 50/163* (2013.01)

(58) Field of Classification Search
None
See application file for complete search history.

(56) References Cited

U.S. PATENT DOCUMENTS

| | | | |
|---|---|---|---|
| 2012/0066187 A1* | 3/2012 | Pearcy | G06F 16/2455 707/E17.11 |
| 2016/0292752 A1* | 10/2016 | Gavriil | G06Q 50/16 |
| 2017/0308549 A1* | 10/2017 | Sims | G06Q 50/167 |
| 2017/0329875 A1* | 11/2017 | Detwiler | G06F 30/13 |
| 2017/0357668 A1* | 12/2017 | Fortin | G06F 16/248 |
| 2019/0220759 A1* | 7/2019 | Tierney | G06T 17/05 |
| 2019/0294647 A1* | 9/2019 | Brouwer, II | G06F 16/9537 |
| 2020/0258174 A1* | 8/2020 | Rodriguez | G06Q 50/163 |

OTHER PUBLICATIONS

Abramovich; Using GIS to Assist Location and Site Selection Decisions ; 2012; University of Washington; https://digital.lib.washington.edu/researchworks/bitstream/handle/1773/20789/Abramovich_washington_0250O_10548.pdf;sequence=1).*

* cited by examiner

*Primary Examiner* — Peter Ludwig
*Assistant Examiner* — Donald J Edmonds
(74) *Attorney, Agent, or Firm* — The Webb Law Firm

(57) ABSTRACT

Systems, devices, products, apparatuses, and/or methods for generating a land parcel for a siting request in a geospatial area by receiving a land parcel request within a requested region to provide requirements for land development siting indicating one or more requested proximity factors, determining at least one primary site selection having a size below a requested sizing threshold based on information received from a geographical information system (GIS) including land parcel data defining a plurality of land parcels and energy data defining a plurality of energy infrastructures, automatically determines geospatial data representing one or more secondary land parcels and generates an updated site selection comprising the at least one primary site selection and at least one of the one or more secondary site selections.

20 Claims, 12 Drawing Sheets

SiteLocator
SITING PLATFORM | GEOSPATIAL REQUEST

AREA OF INTEREST — 202

OHIO
- 204 — Entire State: No | If not entire state, please list counties of interest: [ ]

PENNSYLVANIA
- 206 — Entire State: No | If not entire state, please list counties of interest: Allegheny, Beaver

WEST VIRGINIA
- 208 — Entire State: No | If not entire state, please list counties of interest: [ ]

FIG. 2A

SiteLocator
SITING PLATFORM | GEOSPATIAL REQUEST

SITE REQUIREMENTS — 220

- 222 — Minimum Site Size: 200.00 Acres
- 224 — Maximum Site Size: 300.00 Acres
- 226 — Property Types to Search: (choose all that apply)
  - [✓] Agricultural
  - [ ] Industrial
  - [✓] Vacant
  - [✓] Commercial
  - [ ] Residential
- 228 — Level of Earthwork Allowable: Site may require some engineering/grading (i.e., 5% - 15% slope)
- 230 — Please cite any property owners for which you do not wish to have results returned: Do not include properties owned by Shell Appalachia.

FIG. 2B

SiteLocator
SITING PLATFORM | GEOSPATIAL REQUEST

LOCATIONAL PROXIMITY

| Ref | Field | Value | Ref | Importance |
|---|---|---|---|---|
| 250a | Distance from Interstate Exit: | Within 10 Miles | 250b | 2 - Not Important |
| 252a | Distance from Railroad: | Within 25 Miles | 252b | 2 - Not Important |
| 254a | Distance from Navigable River: | Within 10 Miles | 254b | 2 - Not Important |
| 256a | Distance from FAA Designated Primary Airport (i.e., CLE, MDT, PIT, etc.): | Within 25 Miles | 256b | 2 - Not Important |
| 258a | Distance from Ethane Cracker Plant: | Within 5 Miles | 258b | 5 - Critically Important |
| 260a | Distance from Natural Gas Interstate Pipeline: | Within 5 Miles | 260b | 3 - Important |
| 262a | Distance from Natural Gas Liquids Interstate Pipeline: | Within 3 Miles | 262b | 5 - Critically Important |
| 264a | Distance from Crude Oil Interstate Pipeline: | Within 5 Miles | 264b | 3 - Important |
| 266a | Distance from Power Generating Facility: | Within 5 Miles | 266b | 3 - Important |
| 268a | Distance from Electric Substation: | Within 5 Miles | 268b | 3 - Important |
| 270a | Please explain any other information that may be critical to your siting: (all requests may not be taken into consideration) | I would like to site a large facility heavily reliant on the O&G industry. | | |

FIG. 2C

SYSTEM, METHOD, AND COMPUTER PROGRAM PRODUCT FOR SITING A LAND PARCEL

BACKGROUND

Field of the Invention

The disclosed subject matter relates generally to systems, methods and computer program products for automatic site selection. In particular, the present invention relates to selecting land parcels that satisfy requirements, scoring based on requirements, determining energy resources of a land parcel, providing capability for selection of multiple land parcels based on scores or requirements, generating land parcels, generating site requests and response information including one or more site requests to automatically improve a site request response. A site request interface provides siting interfaces, land parcel scoring and planning interfaces, dynamically updated site response interfaces, and siting improvement notifications based on feedback.

Description of Related Art

Searching for property, in the past, involved either manually surveying the target area for property or using electronic listings to find all homes listed by a professional real estate agent and posted to the Multiple Listing Service ("MLS"), such listings include prices and assessed values from public listing services, real estate websites, and local county assessors. More recently, online systems have become more readily available, such as Zillow, Trulia, and Redfin, companies which aggregate and provide for sale data from a variety of sources, including major national brands, such as Century 21, Coldwell Banker, and Sotheby's. These publicly available options are mainly targeted toward residential housing real estate transactions that are focused on the prices of houses and are mainly used by buyers trying to find a new home and sellers.

Site selection for corporate development often requires a more extensive procedure than a residential real estate search in order to find properties meeting specialized and particular requirements. One of the reasons is that identifying property for corporate projects involves many more factors than a search for residential property. For example, multiple factors may be required for properly siting a new construction project. In a normal siting selection, the initial phase of commercial real estate development involves a great amount of market research and analysis that is used to determine if a proposed development is viable. A successful retail site must meet market demand, satisfy tenant requirements, satisfy lending conditions, meet regulatory restrictions, and must accommodate the customer. During site selection, a real estate developer may view all known properties within a designated area that meet basic site requirements. However, existing real estate systems are not useful for many of the most important factors that go into site selection, including property size, visibility, traffic flow, demographics, zoning, infrastructure, access points, and nearby tenants. Today, the many configurable parameters and potential arrangements make collecting data manually, as predominantly occurred in the past, no longer a competitive option for finding properties that include specialized and particular requirements.

Therefore exists a need for improved site selection techniques.

SUMMARY

Accordingly, it is an object of the presently disclosed subject matter to provide systems, devices, products, apparatuses, platforms, computer products, and/or methods for improved site location of a property comprising multiple land parcels to satisfy a sizing requirement, improving automatic generation of one or more site selections for a site selection platform, improving control of a site selection platform, and/or the like.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

According to some non-limiting embodiments or aspects, provided is a computer-implemented method, comprising: receiving a land parcel request, with a siting system comprising one or more computers, within a requested region, to provide requirements for land development siting indicating one or more requested proximity factors; determining, in a layer generation server, at least one primary site selection having a size below a requested sizing threshold based on information received from a geographical information system (GIS) including land parcel data defining a plurality of land parcels and energy data defining a plurality of energy infrastructures; activating, in the siting system, a request for one or more secondary site selections to fulfill the primary site selection sizing requirement; automatically determining, in a stitching server comprising one or more processors, geospatial data representing one or more secondary land parcels in the requested region that can be combined with the primary site selection based on an objective score associated with features of the plurality of land parcels based on at least one of a land parcel size, type, slope, or proximity; generating, in the stitching server, an updated site selection comprising the at least one primary site selection and at least one of the one or more secondary site selections; and transmitting, from the siting system, response data representing the updated site selection.

According to some non-limiting embodiments or aspects, provided is a system, comprising at least one processor, programmed or configured to: receive a land parcel request within a requested region to provide requirements for land development siting indicating one or more requested proximity factors; determine at least one primary site selection having a size below a requested sizing threshold based on information received from a geographical information system (GIS) including land parcel data defining a plurality of land parcels and energy data defining a plurality of energy infrastructures; automatically determine geospatial data representing one or more secondary land parcels in the requested region that can be combined with the primary site selection based on an objective score associated with features of the plurality of land parcels based on at least one of a land parcel size, type, slope, or proximity; generate an updated site selection comprising the at least one primary site selection and the at least one of the one or more secondary site selections; and display response data representing the updated site selection.

According to some non-limiting embodiments or aspects, provided is a computer program product, comprising at least one non-transitory computer-readable medium including program instructions that, when executed by at least one processor, cause the at least one processor to: receive a land parcel request within a requested region to provide requirements for land development siting indicating one or more requested proximity factors; determine at least one primary site selection having a size below a requested sizing threshold based on information received from a geographical information system (GIS) including land parcel data defining a plurality of land parcels and energy data defining a plurality of energy infrastructures; automatically determine geospatial data representing one or more secondary land parcels in the requested region that can be combined with the primary site selection based on an objective score associated with features of the plurality of land parcels based on at least one of a land parcel size, type, slope, or proximity; generate an updated site selection comprising the at least one primary site selection and the at least one of the one or more secondary site selections; and display response data representing the updated site selection.

Further embodiments or aspects are set forth in the following clauses:

Clause 1: A computer-implemented method comprising: receiving a land parcel request, with a siting system comprising one or more computers, within a requested region, to provide requirements for land development siting indicating one or more requested proximity factors; determining, in a layer generation server, at least one primary site selection having a size below a requested sizing threshold based on information received from a geographical information system (GIS) including land parcel data defining a plurality of land parcels and energy data defining a plurality of energy infrastructures; activating, in the siting system, a request for one or more secondary site selections to fulfill the primary site selection sizing requirement; automatically determining, in a stitching server comprising one or more processors, geospatial data representing one or more secondary land parcels in the requested region that can be combined with the primary site selection based on an objective score associated with features of the plurality of land parcels based on at least one of a land parcel size, type, slope, or proximity; generating, in the stitching server, an updated site selection comprising the at least one primary site selection and at least one of the one or more secondary site selections; and transmitting, from the siting system, response data representing the updated site selection.

Clause 2: The method of clause 1, wherein determining geospatial data representing one or more secondary land parcels, further comprises generating a plurality of buffers by: generating a first buffer that is geospatially located within the requested region and surrounding a first proximity factor by a first distance, wherein the first buffer indicates a land parcel that is within the buffer is within at least the first distance of the first proximity factor; generating a second buffer that is geospatially located within the requested region and surrounding a second proximity factor by a second distance of the land parcel request, wherein the second buffer indicates the land parcel that is within the buffer is within at least the second distance of the second proximity factor; generating an overlay for the requested region with the first buffer and the second buffer, wherein the first buffer indicates a first weight and the second buffer indicates a second weight, and the overlay defines a proximity score for the land parcel of a geospatial area within the plurality of buffers based on the combination of the first buffer overlapping the second buffer; and determining a proximity score for a secondary land parcel based on a location of the primary site selection within the geospatial area of the plurality of buffers.

Clause 3: The computer-implemented method of clauses 1 and 2, wherein one or more additional buffers are generated based on an importance factor of the first proximity factor or the second proximity factor.

Clause 4: The computer-implemented method of clauses 1-3, wherein the additional buffers are in addition to the first buffer, and wherein the additional buffers include an incremental increase to the first distance or the second distance and are associated with an incremental decrease in the first weight from the first buffer.

Clause 5: The computer-implemented method of clauses 1-4, wherein the first proximity factor is used to generate a proximity score by determining distances between a land parcel and a publicly accessible destination, and representing the determined distances by the first proximity distance of the first proximity factor.

Clause 6: The computer-implemented method of clauses 1-5, wherein the importance factor associated with a proximity factor is defined by a numeric scale, a word scale, or other indicator associated with assigning incremental weights to the proximity factor.

Clause 7: The computer-implemented method of clauses 1-6, wherein the importance factor associated with the proximity factor comprises a level, wherein the level includes one of: critically important, very important, important, not important, or not applicable, and additional buffers are created based on the level of the importance factor.

Clause 8: The computer-implemented method of clauses 1-7, wherein a first land parcel proximity score is assigned to each parcel utilizing an overlay and attribute information as stored therein.

Clause 9: The computer-implemented method of clauses 1-8, wherein the energy infrastructures include at least one or more of: crude oil rail transports, railroad transports, interstate exits, navigable rivers, primary airports, natural gas interstate pipelines, natural gas liquids pipelines, crude oil pipelines, power generating facilities, or electric substations.

Clause 10: The computer-implemented method of clauses 1-9, wherein an objective score further comprises at least one of a land parcel size score determined by correlating the land parcel size with a site size of the land parcel request, wherein a high score is assigned to the land parcel having the land parcel size within an area range of the land parcel request, and lower scores are determined based on how far the land parcel size falls outside a size range; a land parcel type score determined by correlating the land parcel size with the site type of the land parcel request, wherein the high score is assigned to the land parcel having the land parcel type matching the site type of the land parcel request and the lower score is determined and assigned based on land parcel types that fall outside the size range; or a land parcel slope score determined by correlating a maximum percent slope determined for the land parcel from a GIS slope layer with a site slope from the land parcel request, wherein a high score is assigned for the land parcel having a maximum percent slope determined for the land parcel equal to or less than the site slope of the land parcel request, and a lower score is determined for a land parcel having a percent slope higher than the site slope of the land parcel request.

Clause 11: The computer-implemented method of clauses 1-10, wherein a score comprises a final score for the land parcel based on at least one of the land parcel size, type, slope, or proximity.

Clause 12: A computing system comprising one or more processors programmed or configured to receive a land parcel request within a requested region to provide requirements for land development siting indicating one or more requested proximity factors; determine at least one primary site selection having a size below a requested sizing threshold based on information received from a geographical information system (GIS) including land parcel data defining a plurality of land parcels and energy data defining a plurality of energy infrastructures; automatically determine geospatial data representing one or more secondary land parcels in the requested region that can be combined with the primary site selection based on an objective score associated with features of the plurality of land parcels based on at least one of a land parcel size, type, slope, or proximity; generate an updated site selection comprising the at least one primary site selection and the at least one of the one or more secondary site selections; and display response data representing the updated site selection.

Clause 13: The computing system of clause 12, wherein determining geospatial data representing one or more secondary land parcels, further comprises generating a plurality of buffers by: generating a first buffer that is geospatially located within the requested region and surrounding a first proximity factor by a first distance, wherein the first buffer indicates a land parcel that is within the buffer is within at least the first distance of the first proximity factor; generating a second buffer that is geospatially located within the requested region and surrounding a second proximity factor by a second distance of the land parcel request, wherein the second buffer indicates the land parcel is within the buffer is within at least the second distance of the second proximity factor; generating an overlay for the requested region with the first buffer and the second buffer, wherein the first buffer indicates a first weight and the second buffer indicates a second weight, and the overlay defines a proximity score for the land parcel of a geospatial area within the plurality of buffers based on the combination of the first buffer overlapping the second buffer; and determining a proximity score for a secondary land based on a location of the primary site selection within a geospatial area of the plurality of buffers.

Clause 14: The computing system of clauses 12-13, wherein one or more additional buffers are generated based on an importance factor of the first proximity factor or the second proximity factor.

Clause 15: The computing system of clauses 12-14, wherein the additional buffers are in addition to the first buffer, and wherein the additional buffers include an incremental increase to the first distance or the second distance and are associated with an incremental decrease in the first weight from the first buffer.

Clause 16: The computing system of clauses 12-15, wherein the first proximity factor is used to generate the proximity score by determining distances between the land parcel and a publicly accessible destination, and representing the determined distances by the first proximity distance of the first proximity factor.

Clause 17: The computing system of clauses 12-16, wherein the importance factor associated with the proximity factor is defined by a numeric scale, a word scale, or other indicators associated with assigning incremental weights to the proximity factor.

Clause 18: The computing system of clauses 12-17, wherein the importance factor associated with the proximity factor comprises a level, wherein the level includes one of: critically important, very important, important, not important, or not applicable, and additional buffers are created based on the level of the importance factor.

Clause 19: The computing system of clauses 12-18, wherein a first land parcel proximity score is assigned to each parcel utilizing an overlay and attribute information as stored therein, wherein the energy infrastructures include at least one or more of: crude oil rail transports, railroad transports, interstate exits, navigable rivers, primary airports, natural gas interstate pipelines, natural gas liquids pipelines, crude oil pipelines, power generating facilities, or electric substations; and an objective score further comprises at least one of: a land parcel size score determined by correlating a land parcel size with a site size of the land parcel request, wherein a high score is assigned to the land parcel having the land parcel size within an area range of the land parcel request, and lower scores are determined based on how far the land parcel size falls outside a size range; a land parcel type score determined by correlating the land parcel size with the site type of the land parcel request, wherein the high score is assigned to the land parcel having a land parcel type matching a site type of the land parcel request and a lower score is determined and assigned based on land parcel types that fall outside a size range; or a land parcel slope score determined by correlating a maximum percent slope determined for the land parcel from a GIS slope layer with a site slope from the land parcel request, wherein the high score is assigned for the land parcel having the maximum percent slope determined for the land parcel equal to or less than the site slope of the land parcel request, and a lower score is determined for the land parcel having a percent slope higher than the site slope of the land parcel request.

Clause 20: A computer program product comprising at least one non-transitory computer-readable medium including one or more instructions that, when executed by the at least one processor, cause the at least one processor to: receive a land parcel request within a requested region to provide requirements for land development siting indicating one or more requested proximity factors; determine at least one primary site selection having a size below a requested sizing threshold based on information received from a geographical information system (GIS) including land parcel data defining a plurality of land parcels and energy data defining a plurality of energy infrastructures; automatically determine geospatial data representing one or more secondary land parcels in the requested region that can be combined with the primary site selection based on an objective score associated with features of the plurality of land parcels based on at least one of a land parcel size, type, slope, or proximity; generate an updated site selection comprising the at least one primary site selection and the at least one of the one or more secondary site selections; and display response data representing the updated site selection.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments or aspects that are illustrated in the accompanying schematic figures, in which:

FIGS. 2A-2C are illustrations of a non-limiting embodiment or aspect of an interface for controlling a siting platform as shown in FIG. 1;

DETAILED DESCRIPTION

Figure 1:
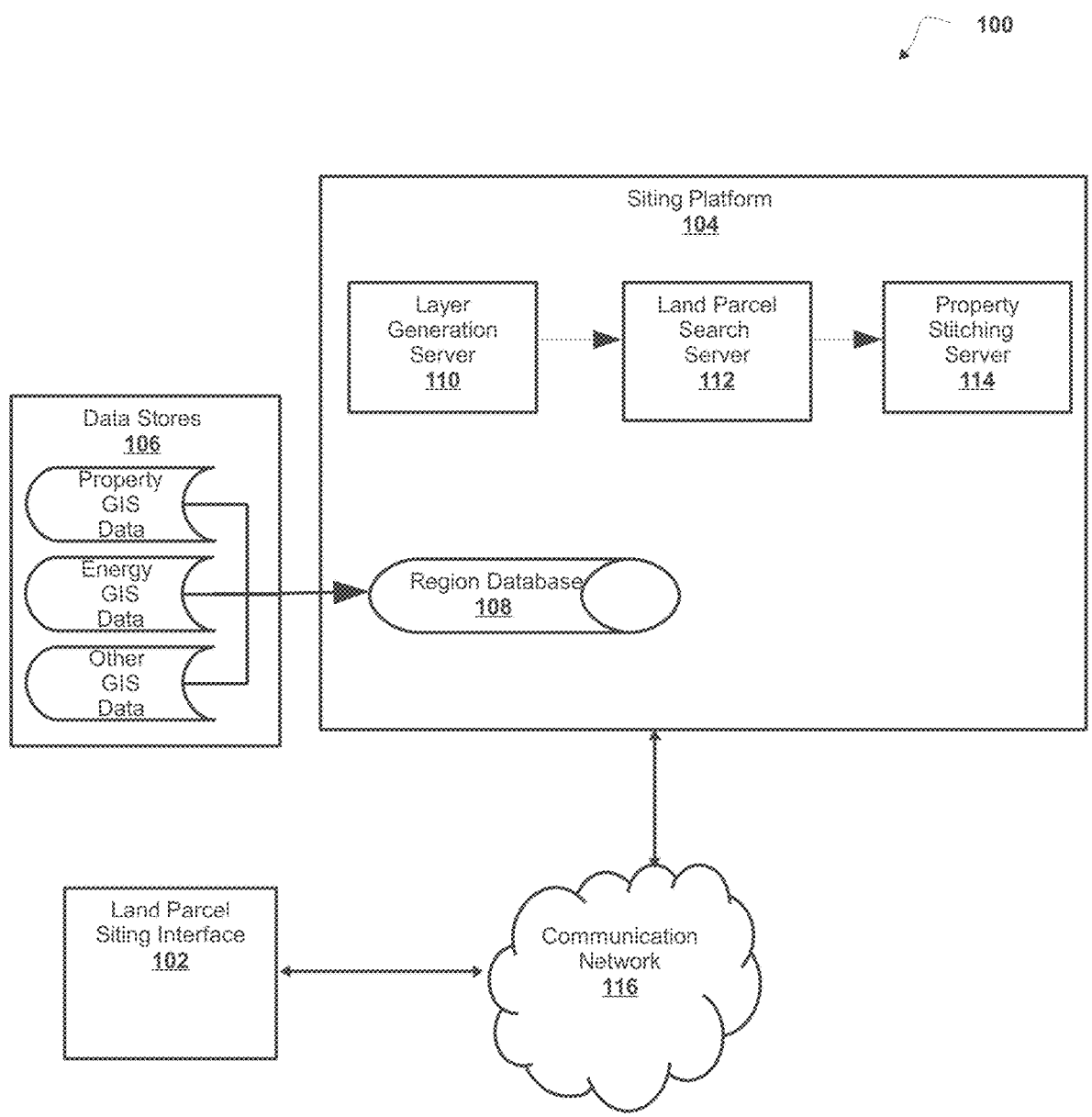
FIG. 1 is a diagram of a non-limiting embodiment or aspect of an environment in which systems, devices, products, apparatuses, and/or methods, described herein, can be implemented.

It is to be understood that the present disclosure may assume various alternative variations and step sequences, except where expressly specified to the contrary. It is also to be understood that the specific devices and processes illustrated in the attached drawings and described in the following specification are simply exemplary and non-limiting embodiments or aspects. Hence, specific dimensions and other physical characteristics related to the embodiments or aspects disclosed herein are not to be considered as limiting.

For purposes of the description hereinafter, the terms "end," "upper," "lower," "right," "left," "vertical," "horizontal," "top," "bottom," "lateral," "longitudinal," and derivatives thereof shall relate to embodiments or aspects as they are oriented in the drawing figures. However, it is to be understood that embodiments or aspects may assume various alternative variations and step sequences, except where expressly specified to the contrary. It is also to be understood that the specific devices and processes illustrated in the attached drawings, and described in the following specification, are simply non-limiting exemplary embodiments or aspects. Hence, specific dimensions and other physical characteristics related to the embodiments or aspects of the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices that are configured to directly or indirectly communicate with or over one or more networks. A computing device may be a mobile or portable computing device, a desktop computer, a server, and/or the like. Furthermore, the term "computer" may refer to any computing device that includes the necessary components to receive, process, and output data, and normally includes a display, a processor, a memory, an input device, and a network interface. A "computing system" may include one or more computing devices or computers. An "application" or "application program interface" (API) refers to computer code or other data sorted on a computer-readable medium that may be executed by a processor to facilitate the interaction between software components, such as a client-side front-end and/or server-side back-end for receiving data from the user. An "interface" refers to a generated display, such as one or more graphical user interfaces (GUIs) with which a user may interact, either directly or indirectly (e.g., through a keyboard, mouse, touchscreen, etc.). Further, multiple computers, e.g., servers, or other computerized devices, such as an autonomous vehicle including a vehicle computing system, directly or indirectly communicating in the network environment may constitute a "system" or a "computing system".

As used herein, the terms "computing device", "mobile device", "client", and "client device" may refer to one or more client-side devices or systems (e.g., remote from a data source) used to initiate or facilitate a siting request. As an example, a "client device" may refer to one or more agent devices used by an agent, one or more agent computers used by an agent system, one or more mobile devices used by a user, and/or the like. In some non-limiting embodiments or aspects, a client device may be an electronic device configured to communicate with one or more networks and initiate or facilitate communications. For example, a client device may include one or more computers, portable computers, laptop computers, tablet computers, mobile devices, cellular phones, wearable devices (e.g., watches, glasses, lenses, clothing, and/or the like), personal digital assistants (PDA), and/or the like.

As used herein, the term "platform" may refer to one or more computing devices (e.g., processors, storage devices, servers, similar computer components, and/or the like) that communicate with client devices and/or other computing devices over a network (e.g., a public network, the Internet, a private network, and/or the like) and, in some examples, facilitate communication among servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor, that is recited as performing a first step or a first function, may refer to the same or different server or the same or different processor recited as performing a second step or a second function.

As used herein, the term "supervised learning" may refer to one or more machine learning algorithms that start with known input variables (x) and an output variable (y), and learn a siting function from the input to the output. The goal of supervised learning is to approximate the siting function so that predictions can be made about new input variables (x) that can be used to predict the output variables (y) for that data. The process of a supervised algorithm learning from the training dataset can be thought of as a teacher supervising the learning process. The correct answers are known. The algorithm iteratively makes predictions on the training data and is corrected by the teacher. Learning stops when the algorithm achieves an acceptable level of performance. Supervised learning problems can be further grouped into regression problems and classification problems. Supervised learning techniques can use labeled (e.g., classified) training data with normal and outlier data, but are not as reliable because of the lack of labeled outlier data. For example, multivariate probability distribution based systems are likely to score the data points with lower probabilities as outliers. A regression problem is when the output variable is a real value, such as "dollars" or "weight". A classification problem is when the output variable is a category, such as "red" and "blue" or "compliant" and "non-compliant".

As used herein, the term "unsupervised learning" may refer to an algorithm which has input variables (x) and no corresponding output variables. The goal for unsupervised learning is to model the underlying structure or distribution in the data in order to learn more about the data. In unsupervised learning there are no correct answers and there is no teacher. Unsupervised learning algorithms are used to discover and present the interesting structure in the data. Unsupervised learning problems can be further grouped into clustering and association problems. A clustering problem is modeling used to discover the inherent groupings in a dataset, such as grouping customers by purchasing behavior. An association rule learning problem is where you want to discover rules that describe large portions of data, such as people that buy A also tend to buy B. Some examples of unsupervised learning algorithms are clustering and likelihood modeling.

As used herein, the term "training" may refer to a process of analyzing training data to generate a model (e.g., create a machine learning algorithm, a prediction model, a classification model, a segmentation model, etc.). For example, a "training server" uses machine learning techniques to analyze the training data to generate the model, often the training data includes numerous examples so that a robust model is generated to solve a problem for many variations present in the data. In some non-limiting embodiments or aspects, generating the model (e.g., based on training data from a variety of sources) is referred to as "training the model." The machine learning techniques include, for example, supervised and/or unsupervised techniques, such as decision trees (e.g., gradient boosted decision trees), logistic regressions, artificial neural networks (e.g., convolutional neural networks), Bayesian statistics, learning automata, Hidden Markov Modeling, linear classifiers, quadratic classifiers, association rule learning, and/or the like. In some non-limiting embodiments or aspects, the model includes a prediction model that is specific to a particular geographic location, a particular user, a particular agent, a particular seller, a particular resource, and/or the like. Additionally or alternatively, the prediction model may be specific to a particular user (e.g., a customer of a siting provider using a cloud hosted site request platform, a customer using an energy specific real estate system, an energy resource of a geospatial mapping provider, etc.). In some non-limiting embodiments or aspects, the training server generates one or more prediction models (e.g., one or more energy resource siting models, one or more land parcel segmentations, etc.) for one or more operators of one or more accounts (e.g., one or more customer accounts, one or more siting provider accounts, a map provider account, etc.), a particular group of customers, and/or the like.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value (e.g., a score, an objective score, etc.) being greater than the threshold, more than the threshold, higher than the threshold, greater than or equal to the threshold, less than the threshold, fewer than the threshold, lower than the threshold, less than or equal to the threshold, equal to the threshold, etc.

Conventional real estate systems provide capabilities for a price centered search, a location centered search, or a combination thereof. Existing systems are used for finding property which meet needs for a residential purchase, and do not account for corporate development. These existing systems are centered around pricing or location (e.g., prices and assessed values are available from public listing services, real estate websites, and local county assessors, etc.) and return individual properties based on multiple configurable parameters depending on how a particular request is entered (e.g., price, location, features of a location such as a school district, etc.). In existing systems, price centric parameters are offered, and other than capabilities for finding residential housing, options are limited. Existing systems are not capable of coordinating property searching based on size, geospatial coordinates, and proximity to environmental and industrial resources, because they are used by sellers to market and sell homes.

Given the high demand for speedy and ubiquitous residential real estate information, existing systems offer capabilities useful for buyers trying to find a new residence, marketing capabilities for agents targeting home sales, or sellers determining a pricing structure. However, since existing systems are price based, they may be incapable and/or unable to sufficiently price and locate many properties in an area, they may be incapable of returning accurate accounting of properties that are not for sale, they may ignore any property not for sale, or they may be unable to display unlisted properties. In addition, existing systems may not provide or may provide insufficient information for delivering multi-property results, which can be used to satisfy threshold sizing requirements for a corporate or industrial property search. In addition, as existing systems may only provide price centric programming, they may not be capable of adapting for searches and sales focused on anything other than residential property, they may be incapable and/or may provide insufficient listing information to even manually determine whether a possible solution exists, they may not be able to perform a search including properties that are not for sale, or they may be unable to take into consideration the proximity of an industrial or environmental surroundings.

A search in an existing system may be unable to produce output and/or may produce insufficient output, may be incapable or without sufficient information to consider aspects of surrounding properties, or may require extensive manual intervention to complete a search of an area. Furthermore, existing computer systems have no mechanism for determining, providing, and/or using knowledge of properties, infrastructure, and environment within a geographic location for generating a land parcel from multiple properties to satisfy sizing aspects, proximity aspects, location aspects, or a combination in relation to a siting request. Accordingly, existing computer systems may not generate a siting response that accurately reflects a size of a site development in a geospatial area, and existing systems may less accurately provide land parcels which match.

Non-limiting embodiments or aspects of the present disclosure are directed to systems, devices, products, apparatuses, and/or methods for generating a land parcel in a geospatial area by receiving a land parcel request within a requested region to provide requirements for land development siting indicating one or more requested proximity factors, determining at least one primary site selection having a size below a requested sizing threshold based on information received from a geographical information system (GIS) including land parcel data defining a plurality of land parcels and energy data defining a plurality of energy infrastructures, transmitting a request for one or more secondary site selections to fulfill the primary site selection sizing requirement, automatically determining geospatial data representing one or more secondary land parcels in the requested region that can be combined with the primary site selection based on an objective score associated with features of the plurality of land parcels based on at least one of land parcel size, type, slope, or proximity, generating, in the stitching server, an updated site selection comprising the at least one primary site selection and at least one of the one or more secondary site selections, and transmitting, from the siting system, response data representing the updated site selection.

In this way, an improved land parcel search can be generated by providing a size centered interface to find land parcels that can be controlled by determining aspects of a plurality of land parcels in a surrounding geospatial region that may satisfy a land parcel search, which can be used by an improved siting platform to more accurately and more efficiently generate a response, a database, or an interface to satisfy a land parcel request that satisfies a siting request. The improved siting platform can provide a size centric search by determining, providing, and/or utilizing geospatial aspects of one or more properties, infrastructure, or environment within a geographic location to more accurately and efficiently generate a land parcel from multiple land parcels in a geospatial area based on map data to satisfy sizing aspects, proximity aspects, location aspects, or a combination in relation to a siting request. The automatic response may be generated more efficiently and/or more accurately than existing systems by the siting platform determining a scored account of land parcels in a target region and determining personalized scores for land parcels represented by a uniform scale based on one or more essential aspects that may satisfy a request (e.g., a corporate development request, an industrial development request, etc.).

In addition, an improved siting platform is capable or configured to provide generated land parcels (e.g., generate accurate land parcels to satisfy a search, generate improved land parcels in a geospatial area, determine and utilize properties that may not be for sale, more accurately satisfy search requests using property whether available, unavailable, or unlisted, etc.) in response to a search for a particularly sized property that may be otherwise unavailable in a geographic location, based on aspects in a geospatial area of the geographic location, or aspects in a geospatial area surrounding the geographic location. The improved siting platform of the present disclosure is capable of generating and/or returning more accurate responses with land parcels and scoring metrics based on sizing, geospatial coordinates, and/or proximity to environmental and industrial resources (e.g., provide multi-property results which can be used to satisfy threshold sizing requirements for a property search, generate land parcels by adapting searches to score land parcels to control a stitching computer for generating new land parcels, generate a siting response, which corresponds to the determination of scoring aspects of surrounding properties, etc.). In this way, the siting platform accurately generates a siting response that includes a size of a site development in a geospatial area matching or comparable to a requested size and satisfies one or more infrastructure relationships with respect to the resulting land parcel generated by the improved siting platform.

Referring now to FIG. 1, FIG. 1 is a diagram of an example siting system 100 in which devices, systems, methods, and/or products described herein, may be implemented. As shown in FIG. 1, siting system 100 includes land parcel siting interface 102, data stores 106, siting platform 104, and region database 108. Systems and/or devices of siting system 100 can interconnect via wired connections, wireless connections, or a combination of wired and wireless connections. In some non-limiting embodiments or aspects, land parcel siting interface 102 provides an interface to input and send a siting request to the siting platform 104 to find property (e.g., real estate in the form of land and the infrastructure, buildings, homes, or housing on it, natural resources such as crops, minerals, gas, or water, immovable property, etc.). For example, land parcel siting interface 102 may include a computing device that is programmed and/or configured to display land parcel siting interface 102 that may include a user interface for entering information (e.g., one or more requirements of a land parcel that a user is requesting, etc.) for generating a siting request to control the siting platform 104 during a search. An example of the land parcel siting interface 102, including requirements from a user is shown in further detail below with reference to FIGS. 2A-2C In some non-limiting embodiments or aspects, siting platform 104 may be implemented in software, hardware or a combination of software and hardware. In some cases, region database 108 may be combined with siting platform 104. In addition, siting platform 104 also includes layer generation server 110, land parcel search server 112 and property stitching server 114, which may be implemented in software, hardware or a combination of software and hardware. In some examples, siting platform 104 may be combined with any of layer generation server 110, land parcel search server 112, property stitching server 114, or alternatively, can be networked resources configured to provide and/or receive one or more of information with GIS content and/or services.

In some non-limiting embodiments or aspects, data stores 106 includes one or more devices capable of receiving information and/or data from one or more map generation systems via communication network 116 and/or communicating information and/or data to region database 108 via communication network 116. Data stores 106 include, but are not limited to, property GIS data, energy GIS data (e.g., energy infrastructure data, energy asset ownership, energy production records, energy processing capacities, physical locations of energy infrastructure, planned infrastructure projects, acquisition records, etc.), and other GIS data including proprietary databases, the Internet, on-site inspections, satellite images, aerial images, fly by inspections of a drone, airplane or helicopter, public records, land use data, parcel information, federal data, such as the USGS, real estate listings from the Multiple Listing Service ("MLS") and other providers, commercial databases and information sources, historical weather information, and confidential user provided data, such as proprietary sales information. By conducting continuous polling, the data of data stores 106 is ensured to contain up-to-date-information.

In some non-limiting embodiments or aspects, energy infrastructure data may include data pertaining to oil, electricity, natural gas, refinery products, and/or the like, and may include information related to the upstream oil and gas industry in North America. For example, energy infrastructure data includes information associated with all pipelines and facilities related to the gathering, processing, transportation, and distribution of crude oil in North America (e.g., pipelines of all types and sizes, refineries and terminals, etc.). In another example, energy infrastructure data includes information associated with data (e.g., data layers, map layers, etc.) related to the electricity transmission and distribution in the United States. Other commodity transmission pipelines in the United States may be included, such as Ammonia and CO2 pipelines, or smaller and shorter pipelines linking facilities with feedstock gasses. Energy infrastructure data also includes information associated with the natural gas dataset and is the largest dataset in the energy GIS service, such as all pipelines and facilities related to the gathering, processing, transportation and distribution of natural gas in North America (e.g., pipelines of all system types and sizes, processing plants, compressors, LNG terminals, storage facilities, meter points, etc.). Energy infrastructure data includes information associated with pipelines and facilities related to the transportation of refined products (e.g., liquids, such as natural gas liquids, liquefied petroleum, hydrocarbons, etc.) in North America (e.g., gasoline, jet fuel, diesel, benzenes, kerosene, etc.).

In some non-limiting embodiments or aspects, region data is received by region database 108 from data stores 106 or siting platforms 104, or alternatively, an internet server may be converted by the data stores 106 into acceptable GIS formats for the siting platform 104, which may be commercially available formats, including shape files (which may be referred to as "shapefiles"), which may conform to an Environmental Systems Research Institute (Esri) format. The shapefiles may be uploaded to the GIS server using a standard user interface of the GIS server. The land parcel siting interface 102 may transmit or receive data directly in a geospatial data format (e.g., shapefiles, etc.) with the siting platform 104.

The output data is transmitted to the siting platform 104 from the data stores 106, and are stored in a region database 108. The output data (which may be in the form of a plurality of shapefiles), and thus the stored GIS data, include the GIS data in the form of land-parcels data, representing the land-parcels and their respective processed attributes in a region determined by the siting platform 104, in addition to, layers data representing separate layers associated with the region (e.g., energy infrastructure data, real estate data, list data, etc.).

In some non-limiting embodiments or aspects, siting platform 104 receives the siting request and processes the request. For example, a siting request is received and/or processed by layer generation server 110 to determine GIS data for at least one region of interest based on the user's land parcel requirements, including size and location. The siting platform 104 may communicate requests to data stores 106 for GIS data based on the received siting request. In some non-limiting embodiments or aspects, siting platform 104 processes a request and sends only the land parcels and/or information needed to populate a database with information pertaining to a specific region that matches the siting request (e.g., a siting request for a land parcel made by the user, etc.). In some examples, the output data from the data stores 106 may be stored in the region database 108 by the siting platform 104, or alternatively, a communication connection can be configured between data stores 106 and region database 108 for transfer of data (e.g., real-time data transfer, etc.). In some examples, an siting platform 104 may include a GIS application program interface (API) for the region database 108, which receives data queries and respective access keys from the siting platform 104, and returns the query results by applying the queries to the stored GIS data in the region database 108. The siting platform 104 generates siting response data from the stored GIS data. In some non-limiting embodiments or aspects, GIS data are divided into a plurality of datasets for the overall region as multiple regional datasets stored separately in the region database 108 (e.g., separate data instances, separate tables, separate shapefiles, etc.). Layer generation server 110 may provide data queries that identify regions (e.g., submap identifiers, region identifiers, etc.) corresponding to one or more regions so that the siting platform 104 can select one or more of the region datasets for handling a siting request, which can reduce the time to process the query, particularly for large regions and multi region queries. For frequent data queries, processing the stored data for only one region at a time can substantively improve performance.

The region database 108 may include commercially available computer hardware, and may communicate with the accessible databases of data stores 106 using commercially available connectors and communications protocols. In some non-limiting embodiments or aspects, the siting platform 104 imports and processes the GIS data for the platform system 100.

In some non-limiting embodiments or aspects, siting platform 104 includes land parcel search server 112 programmed or configured to generate and apply one or more buffered GIS layers. One or more GIS layer processing structures (e.g., buffer ring data structures, etc.) may be created for one or more respective proximity factors (e.g., criteria such as, for example, if the requestor prefers a site to be within one mile of an interstate exit, a high score is assigned to properties within a mile of that range, the distance submitted in the siting request. Continuing with the example, depending on the importance of this factor, GIS buffer rings are created with a lower score (e.g., an incremental increase, a percentage step, etc.) signaling a different score as a location of a land parcel with respect to an energy infrastructure or other required structure changes. The importance factor indicating a score change based on a hierarchy, such as, if the user selects "4—Very Important", three additional buffer rings are created outside of the original buffer using a 10% incremental increase of the original distance cites and each additional buffer ring receives a score of 20% less than the previous buffer ring. Further details regarding non-limiting embodiments of buffer rings data structures used to process land parcels and generate proximity scores are provided below with regard to FIG. 5.

In some non-limiting embodiments or aspects, siting platform 104 includes property stitching server 114. The property stitching server 114 first selects all properties that adjoin the parcel being reviewed. Starting with the adjoining parcel that has the current highest SiteLocator Score, the tool reviews the parcel to determine if the parcel is suitable for development per the user's request. In some examples, property stitching server 114 analyzes a land parcel to determine if the property would make an impact on the total size of the site based on its standalone acreage. Property stitching server 114 may ignore a property below a threshold based on the overall size required (e.g., a land parcel 0.20 acres in size may be avoided when searching for a property that needs to be at least 500 acres).

In some non-limiting embodiments or aspects, data stores 106 and/or siting platform 104 (e.g., region database 108 of siting platform 104) may include one or more devices capable of receiving, storing, and/or providing map data (e.g., pipeline map data, railway map data, an evidence map layer with energy infrastructure, Spatial Index (H3) data, Google's S2 geometry data, etc.) associated with a map (e.g., a map, a submap, an energy infrastructure map, a region map, an H3 cell, an S2 cell, etc.) of a geographic location (e.g., a country, a state, a county, a city, a portion of a city, a township, a portion of a township, etc.) including one or more objects (e.g., energy infrastructure, an airport, a train road, a pipeline, etc.) in proximity to and/or within a land parcel (e.g., objects in proximity to the land parcel edges and/or within the land parcel), a property, a road, and/or the like. In some non-limiting embodiments or aspects, a map of a geographic location includes one or more routes that include one or more roadways. In some non-limiting embodiments or aspects, map data associated with a map of the geographic location associates each land parcel, object, or road.

In some non-limiting embodiments or aspects, communication network 116 includes one or more wired and/or wireless networks. For example, communication network 116 includes a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The components of siting system 100 may communicate with each other via, for example, two communication networks of the same type as communication network 116. Networks may each be, for example, an internal wired network, a Virtual Private Network (VPN) or the Internet. Networks connecting components of siting system 100 may be the same or different networks. In alternative embodiments, all of the components of siting system 100 may communicate using a single network (not shown), such as the Internet. In other alternative embodiments, the land parcel Siting platform 104 may utilize more than two networks (not shown). For example, communication network 116 may be replaced by a first network for communication between land parcel siting interface 102 and siting platform 104, and a second network for communication between siting platform 104 and data stores 106. In this example, land parcel siting interface 102 may not be connected with the second network, and data stores 106 may not be connected with the first network.

The number and arrangement of systems, devices, and networks shown in FIG. 1 are provided as an example. There can be additional systems, devices and/or networks, fewer systems, devices, and/or networks, different systems, devices, and/or networks, or differently arranged systems, devices, and/or networks than those shown in FIG. 1. Furthermore, two or more systems or devices shown in FIG. 1 can be implemented within a single system or a single device, or a single system or a single device shown in FIG. 1 can be implemented as multiple, distributed systems or devices. Additionally, or alternatively, a set of systems or a set of devices (e.g., one or more systems, one or more devices) of siting system 100 can perform one or more functions described as being performed by another set of systems or another set of devices of siting system 100.

Referring now to FIGS. 2A-2C, FIGS. 2A-2C are illustrations of a non-limiting embodiments or aspect of an interface for controlling a siting platform. As shown in FIG. 2A, geospatial request 200 includes entering an area of interest 202 including in some non-limiting embodiments or aspects, for example an entire state or a portion of a state (e.g., one or more counties, one or more cities, one or more streets, based on geographical coordinates, based on a distance from a center of a location, etc.). For example, an entire area or a portion of Ohio 204, Pennsylvania 206 (e.g., Allegheny, Beaver, etc.), or West Virginia 208 may be entered or selected. Alternatively, area of interest 202 can be limited down to a smaller portion of a state, such as a county, including Allegheny and Beaver as shown in FIG. 2A.

With reference to FIG. 2B, geospatial request 200 includes site requirements 220 for describing aspects of a site that can be used to find land parcels during the steps of generating a siting response by siting platform 104. In some non-limiting embodiments or aspects, siting requirements may include a size, such as a minimum site size 222 (200.00) or a maximum site size 224 (300.00). In such an example, the siting requirements can be used to limit the property types to search 226, as shown, including a check mark for indication (e.g., agricultural (check), industrial (not checked), vacant (check), commercial (check), residential (not checked)). The siting request may indicate a level of earthwork allowable 228, for example, as shown, a site may require some additional earthwork/engineering/grading as shown (i.e., 5%-15% slope). Other types of interfaces may provide information about types of property that should be avoided during a siting request, for example, property to avoid 230 may include input of reasons and/or reason codes that can be used to eliminate property from a siting request (e.g., do not include properties owned by Shell Appalachia).

With reference to FIG. 2C, geospatial request 200 includes a locational proximity 248 associated with a proximity factor (e.g., dimension, field, etc.) of a land parcel, the dimension is for quantifying a property based on the relative importance of the dimension in the overarching request. For example, in some non-limiting embodiments or aspects, locational proximity 248 includes a distance proximity factor 250a from interstate exit and corresponding importance 250b, distance proximity factor 252a from railroad and corresponding importance 252b, distance proximity factor 254a from navigable river and corresponding importance 254b, distance proximity factor 256a from primary airport and corresponding importance 256b, distance proximity factor 258a from cracker plant and corresponding importance 258b, distance proximity factor 260a from natural gas pipeline and corresponding importance 260b, distance proximity factor 262a from liquid gas pipeline and corresponding importance 262b, distance proximity factor 264a from crude oil pipeline and corresponding importance 264b, distance proximity factor 266a from power generating facility and corresponding importance 266b, distance proximity factor 268a from electric substation and corresponding importance 268b, along with siting information 270a for adding instructions. Locational proximity 248 may embed information for the siting platform 104 that can be used to determine land parcels in a geospatial area that match a request, or alternatively, to find properties by ranking, sorting, or ordering properties based on the factors. In some non-limiting embodiments or aspects, locational proximity 248 is used to score land parcels based on a ranking to determine land parcels that satisfy a siting request with respect to the locational proximity factors of locational proximity 248. Such land parcels, which satisfy all of the factors of the locational proximity 248, may rank the highest, or a limited subset may be used by the siting platform to generate one or more land parcels in response to the geospatial request 200.

As shown in FIG. 2C, locational proximity 248 of geospatial request 200 in a non-limiting embodiment or aspect may be used to set the proximity requirements to control the generation of a siting response. In such an example, a land parcel is requested based on the factors, including distance proximity factor 250a from interstate exit set to within 10 miles where corresponding importance 250b is not important, distance proximity factor 252a from railroad is set to within 25 miles and corresponding importance 252b is not important, distance from navigable river proximity factor 254a is set to within 10 miles and corresponding importance 254b is not important, distance from primary airport 256a is set to within 25 miles and corresponding importance 256b is not important, distance from cracker plant proximity factor 258a is set to within 5 miles and corresponding importance 258b is critically important, distance from natural gas pipeline 260a is set to within 5 miles and corresponding importance 260b is important, distance from liquid gas pipeline 262a is set to within 3 miles and corresponding importance 262b is critically important, distance from crude oil pipeline proximity factor 264a is set to within 5 miles and corresponding importance 264b is important, distance from power generating facility proximity factor 266a is set to within 5 miles and corresponding importance 266b is important, and distance from electric substation proximity factor 268a is set to within 5 miles and corresponding importance 268b is important. In such an example, the proximity factors are determined in relation to the land parcel. A score is generated or derived based on the proximity factors for the land parcel.

Figure 3:
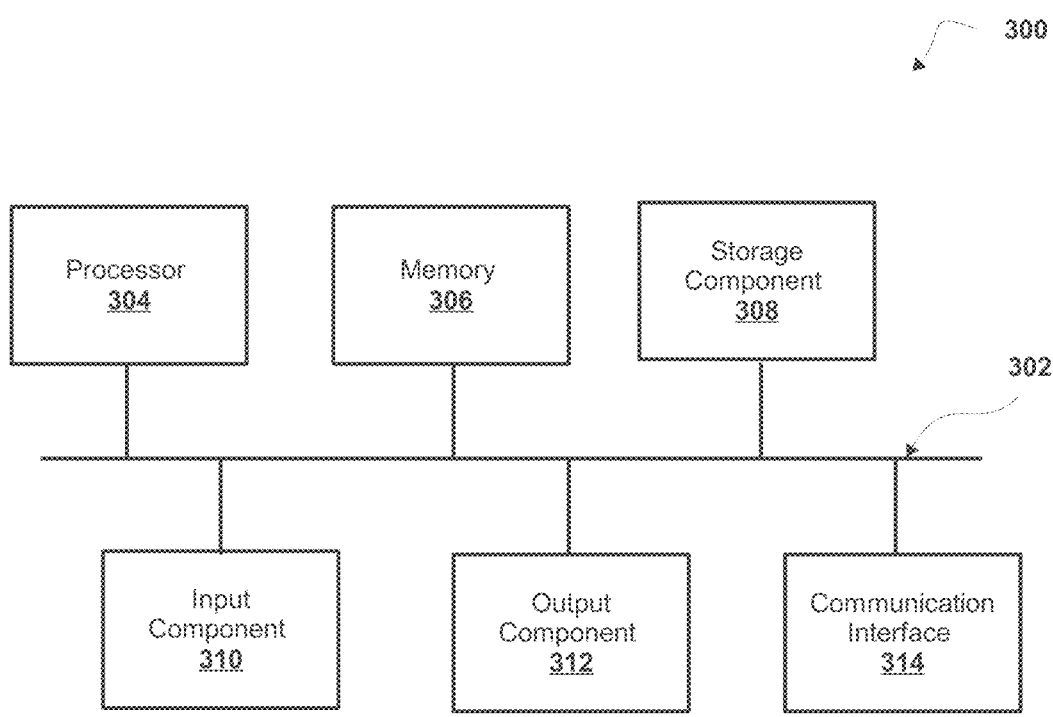
FIG. 3 is a diagram of a non-limiting embodiment or aspect of components of one or more devices and/or one or more systems of FIGS. 1 and 2A-2C.

Referring now to FIG. 3, FIG. 3 is a diagram of example components of a device 300. Device 300 can correspond to one or more devices of siting system 100, one or more devices of land parcel siting interface 102, one or more devices of (e.g., one or more devices of a system of) data stores 106, one or more devices of (e.g., one or more devices of a system of) siting platform 104, and/or one or more devices of regional database 108. In some non-limiting embodiments or aspects, one or more devices of siting system 100, one or more devices of land parcel siting interface 102, one or more devices of (e.g., one or more devices of a system of) data stores 106, one or more devices of (e.g., one or more devices of a system of) siting platform 104, and/or one or more devices of region database 108 can include at least one device 300 and/or at least one component of device 300. As shown in FIG. 3, device 300 includes bus 302, processor 304, memory 306, storage component 308, input component 310, output component 312, and communication interface 314.

Bus 302 includes a component that permits communication among the components of device 300. In some non-limiting embodiments or aspects, processor 304 is implemented in hardware, firmware, or a combination of hardware and software. For example, processor 304 includes a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 306 includes a random access memory (RAM), a read only memory (ROM), and/or another type of dynamic or static storage device (e.g., flash memory, magnetic memory, optical memory, etc.) that stores information and/or instructions for use by processor 304.

Storage component 308 stores information and/or software related to the operation and use of device 300. For example, storage component 308 includes a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 310 includes a component that permits device 300 to receive information, such as via user input (e.g., a touch screen display, a keyboard, a keypad, a mouse, a button, a switch, a microphone, etc.). Additionally or alternatively, input component 310 includes a sensor for sensing information (e.g., a global positioning system (GPS) component, an accelerometer, a gyroscope, an actuator, etc.). Output component 312 includes a component that provides output information from device 300 (e.g., a display, a speaker, one or more light-emitting diodes (LEDs), etc.).

Communication interface 314 includes a transceiver-like component (e.g., a transceiver, a separate receiver and transmitter, etc.) that enables device 300 to communicate with other devices, such as via a wired connection, a wireless connection, or a combination of wired and wireless connections. Communication interface 314 can permit device 300 to receive information from another device and/or provide information to another device. For example, communication interface 314 includes an Ethernet interface, an optical interface, a coaxial interface, an infrared interface, a radio frequency (RF) interface, a universal serial bus (USB) interface, a Wi-Fi interface, a cellular network interface, and/or the like.

Device 300 can perform one or more processes described herein. Device 300 can perform these processes based on processor 304 executing software instructions stored by a computer-readable medium, such as memory 306 and/or storage component 308. A computer-readable medium (e.g., a non-transitory computer-readable medium) is defined herein as a non-transitory memory device. A memory device includes memory space located inside of a single physical storage device or memory space spread across multiple physical storage devices.

Software instructions can be read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry can be used in place of or in combination with software instructions to perform one or more processes described herein. Thus, embodiments described herein are not limited to any specific combination of hardware circuitry and software.

Memory 306 and/or storage component 308 may include data storage or one or more data structures (e.g., a database, etc.). Device 300 may be capable of receiving information from, storing information in, communicating information to, or searching information stored in the data storage or one or more data structures in memory 306 and/or storage component 308. In some non-limiting embodiments or aspects, the information may include data (e.g., GIS information, Map data, one or more prior land parcels, user information, etc.) associated with one or more regions and/or one or more siting requests.

The number and arrangement of components shown in FIG. 3 are provided as an example. In some non-limiting embodiments or aspects, device 300 includes additional components, fewer components, different components, or differently arranged components than those shown in FIG. 3. Additionally or alternatively, a set of components (e.g., one or more components) of device 300 can perform one or more functions described as being performed by another set of components of device 300.

Figure 4:
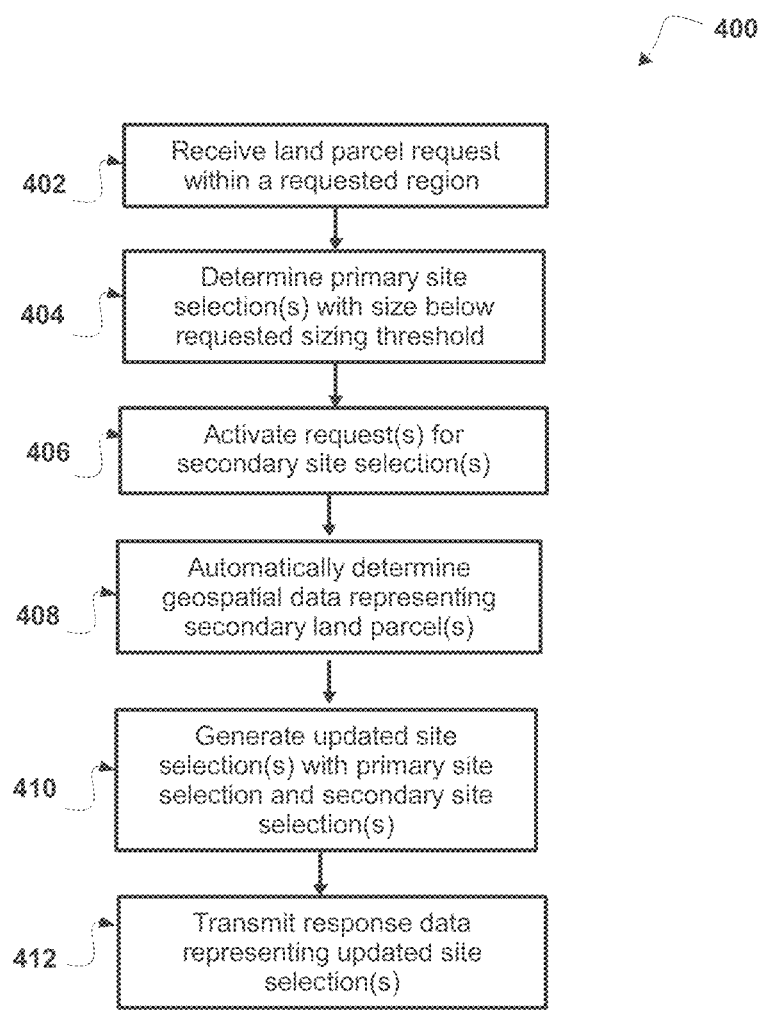
FIG. 4 is a flowchart of a non-limiting embodiment or aspect of a process for generating a site selection.

Referring now to FIG. 4, FIG. 4 is a flowchart of a non-limiting embodiment or aspect of a process 400 for generating a site selection. In some non-limiting embodiments or aspects, one or more of the steps of process 400 are performed (e.g., completely, partially, etc.) by land parcel siting interface 102 (e.g., a mobile device displaying land parcel siting interface 102, etc.), one or more steps of process 400 are performed (e.g., completely, partially, etc.) by data stores 106 (e.g., one or more computing devices operating data stores 106, etc.) or more of the steps of process 400 are performed (e.g., completely, partially, etc.) by siting platform 104 (e.g., one or more processors of a layer generation server 110, one or more processors of a land parcel search server 112, one or more processors of a property stitching server 114, etc.). In some non-limiting embodiments or aspects, one or more of the steps of process 400 are performed (e.g., completely, partially, etc.) by another device or a group of devices separate from or including land parcel siting interface 102, such as one or more devices of (e.g., one or more devices of a system of) a region database 108.

As shown in FIG. 4, at step 402, process 400 includes receiving a land parcel request within a requested region. For example, siting platform 104 receives a land parcel request within a requested region from land parcel siting interface 102. As an example, siting platform 104 obtains a land parcel request identifying a requested region from land parcel siting interface 102 indicating one or more requested proximity factors.

Siting platform 104 includes geospatial site selection hardware and software programmed and/or configured to provide or allow users to submit siting requirements for land development siting (e.g., to develop within a desired distance of a cracker plant, a level of earthwork allowable, a site location in states, counties, etc.) that generates suggested property locations that meet their requirements.

Siting platform 104 determines a subset of GIS parcels within a region based on the siting request by the user (e.g., a user selected state, county, etc.) is created.

Siting platform 104 prioritizes the suggested output of property locations based on an objective score (e.g., an energy score, sizing score, type score, proximity score, slope score, a combined score, etc.). Siting platform 104 ranks and rates factors associated with land parcels provided by a siting request. The score is used to arrange (e.g., rank, order, sort, etc.) land parcels satisfying at least one factor. For example, siting platform 104 arranges output data, such as sorting in descending order output (e.g., land parcel data and associated information, etc.) to be displayed in a multipage format.

The siting platform 104 stitches land parcels (e.g., properties, etc.) together in real-time to create new properties that may satisfy a user's siting request. For example, siting platform 104 outputs a plurality of updated properties, the updated properties comprising a plurality of land parcels that are algorithmically combined together into a land parcel that satisfies factors (e.g., criteria, requirements, conditions, etc.) provided by a user. In one example, if a user sends a siting request as shown and explained further with reference to FIG. 2A-2C, in a process of siting a property (e.g., searching for a property, etc.) having certain or specific criteria (e.g., factors, etc.) of at least 150 acres in size, wherein siting platform 104 generates properties by stitching together multiple land parcels (i.e., 100 acres, 30 acres, and 20 acres) with adjoining boundaries to fulfill the siting request of 150 acres, and satisfy criteria regardless if it is on an MLS real estate listing, or even exists as one land parcel. Existing systems may be able to list the properties individually if a context is provided, however, such systems are unable and/or incapable to produce or generate output from existing land parcels in this manner. In some non-limiting embodiments or aspects, siting platform 104 outputs (e.g., exports, transmits, etc.) multiple properties (e.g., at least 20 different siting results per query, etc.) in real-time (e.g., within minutes, etc.).

The one or more requested proximity factors may include one proximity factor or a plurality of proximity factors, such as a first and second proximity factor (e.g., criteria, required infrastructure, required land formation, required roadway, etc.) that are used to generate a proximity score by determining distances between a land parcel and a publicly accessible destination. In some examples, a first proximity factor may represent or indicate the determined distances between a land parcel and a factor.

In some non-limiting embodiments or aspects, an importance factor may be associated with a proximity factor. The importance factor, in some examples, provides a weight (e.g., defined by a numeric scale, a word scale, other indicator, etc.), for example, incremental weights assigned to a proximity factor for stepping down an importance factor. An importance factor associated with a proximity factor comprises one or more weights that indicate a number of levels and a scale associated with the levels used to create additional or a set of buffers (e.g., geospatial buffers, map buffers, etc.) based on the level of the importance factor. In some examples, the importance factor includes one of: critically important, very important, important, not important, not applicable, and/or the like.

A desired land parcel may be generated by the land parcel siting interface 102 to include properties or, alternatively types of properties, sought or requested by a user. For example, the land parcel siting interface 102 may provide a land parcel file generation for creating a desired size and proximity to energy infrastructure. In some non-limiting embodiments or aspects, locations of interest may be submitted, for example, as an address or geospatial coordinate, where the siting platform 104 may include any land parcels within a distance (e.g., 10 miles, within a range, etc.), a GIS shape, a geospatial polygon, and/or the like, of the location of interest that may be submitted. Land parcel siting interface 102 may include properties, factors, layers, and other information for forming a siting request in any land parcels of the area of the polygon.

In some non-limiting embodiments or aspects, any parcels with cultural and environmental concerns may be removed from a set of land parcels to analyze. For example, a parcel layer that provides a number of land parcels (e.g., candidate land parcels, land parcels satisfying requirements of the siting request, etc.) are further refined using the proximity criteria layer to clip (e.g., remove, limit, etc.) the subset of parcel polygons.

As shown in FIG. 4, at step 404, process 400 includes determining at least one primary site selection with size below requested sizing threshold. For example, siting platform 104 determines at least one primary site selection with size below requested sizing threshold. As an example, siting platform 104 obtains a land parcel request identifying a requested region from land parcel siting interface 102 that includes a plurality of land parcels (e.g., thousands of land parcels, etc.) that are analyzed in association with a sizing threshold. The sizing threshold may be received from a user of the land parcel siting interface 102 (e.g., one or more computing devices of the land parcel siting interface 102, etc.).

In some non-limiting embodiments or aspects, siting platform 104 determines at least one primary site selection having a specified size. For example, land parcel search server 112 determines land parcels below a requested sizing threshold and land parcel search server 112 may determine a size to match the requested size by searching land parcels based on information received from a GIS, including land parcel data defining a plurality of land parcels and energy data defining a plurality of energy infrastructures.

In some non-limiting embodiments or aspects, land parcel search server 112 determines land parcels based on one or more objective scores, the objective scores generated and assigned to a land parcel, used to determine if a land parcel satisfies required conditions associated with the siting request of the client. Land parcel search server 112 may include only those land parcels that satisfy the required conditions when determining land parcels. Land parcel search server 112 determines several types of objective scores. Objective scores may be combined into an overarching objective score.

Land parcel search server 112 may determine candidate land parcels satisfying objective scores (e.g., land proximity score, land parcel size score, land parcel type score, etc.) assigned to one or more land parcels. In one example, a proximity score is assigned utilizing map layers, such as a proximity overlay with attribute information stored therein. A best proximity score (e.g., a high score, a top level score, etc.) is assigned to each land parcel utilizing the GIS overlay and attribute information as held within the proximity layer.

In some non-limiting embodiments or aspects, siting platform 104 generates and provides an objective score further comprising one of land parcel proximity score, land parcel size score, or land parcel type score. A land parcel proximity score (e.g., a first land proximity score, land parcel slope score, etc.) is assigned to each parcel utilizing an overlay and attribute information as stored in data stores 106 or region database 108.

Land parcel search server 112 determines a land parcel size score by correlating a land parcel size with a site size of the land parcel request. Land parcel search server 112 determines a high land parcel size score to assign to the land parcel when a land parcel size is within an area range of the land parcel request. Additionally or alternatively, land parcel search server 112 determines lower scores based on how far the land parcel size falls outside the size range.

In some non-limiting embodiments or aspects, siting platform 104 determines a land parcel type score based on a parcel type SiteLocator score is calculated based on the property type(s) requested. For example, land parcel search server 112 correlates a land parcel size with a site type of the land parcel request to determine land parcel type score. Land parcel search server 112 determines a maximum land parcel type score (e.g., high score, etc.) that is assigned to a land parcel that includes a land parcel type matching a site type of the land parcel request. In addition, Land parcel search server 112 may determine alternate scores (e.g., lower scores than the high score, etc.) based on land parcel types that fall outside the size range. Alternate scores can be assigned and used when a high score is not satisfied.

In some non-limiting embodiments or aspects, siting platform 104 determines a land parcel slope score by correlating a maximum percent slope determined for the land parcel from a GIS slope layer with a site slope from the land parcel request. A maximum (e.g., high score, etc.) land parcel slope score is assigned for a land parcel having a maximum percent slope determined for the land parcel equal to or less than the site slope of the land parcel request, and a lower score is determined for a land parcel having a percent slope higher than the site slope of the land parcel request.

In some non-limiting embodiments or aspects, the slope SiteLocator score is added to each land parcel. The maximum percent slope is determined for each parcel from a previously created slope layer generated from a digital elevation model. If the slope of the property is equal to or less than the user submitted criteria, the score is high. If the percent slope is higher than the requestor's preference, the score is adjusted lower.

As shown in FIG. 4, at step 406, process 400 includes activating a request for a secondary site selection. For example, siting platform 104 activates a request for a secondary site selection. As an example, siting platform 104 transmits a request for a secondary site selection to property stitching server 114. Property stitching server 114 activates computer hardware or software for determining one or more secondary site selections to fulfill the primary site selection sizing requirement.

The SiteLocator slope score is added to each parcel. The maximum percent slope is determined for each parcel from a previously created slope layer generated from geometric and digital elevation models. Land parcel search server 112 may assign land parcels a best score when the slope of the property is equal to or less than the user submitted criteria, and when a slope (e.g., a percent of a slope is higher than a requested preference, etc.) the score is lower.

In some non-limiting embodiments or aspects, siting platform 104 generates a final SiteLocator score (e.g., an aggregated score, an objective score, etc.). For example, land parcel search server 112 determines the final SiteLocator score based on one or more of land parcel size, land parcel type, land parcel slope, and/or land parcel proximity. Land parcel search server 112 may first generate land parcel score, land parcel type score, land parcel slope score, land parcel proximity score, and/or the like, and then calculate the final SiteLocator score for the parcel based on all of the scores, or alternatively a subset identified as having most importance. In some examples, the objective score comprises a final score for the land parcel based on at least one of the parcel size score, parcel type score, slope score, or proximity score.

The land parcel with highest SiteLocator score is selected. If the selected land parcel meets the size requirement as originally defined by the requestor, no further geospatial operations are needed. The map creation process is invoked.

In some non-limiting embodiments or aspects, property stitching server 114 determines the adjacent touching parcels, and can be used by the stitching algorithm based on size, slope, proximity, and other factors, when the selected land parcel does not meet the size requirement (e.g., is below a threshold score, etc.).

As shown in FIG. 4, at step 408, process 400 includes automatically determining geospatial data representing one or more secondary land parcels. For example, siting platform 104 automatically determines geospatial data representing one or more secondary land parcels. As an example, property stitching server 114 automatically determines geospatial data representing one or more secondary land parcels.

In some non-limiting embodiments or aspects, property stitching server 114 automatically determines geospatial data representing one or more secondary land parcels in the requested region that can be combined with the primary site selection based on an objective score associated with features of the plurality of land parcels based on at least one of land parcel size, type, slope, or proximity.

In some non-limiting embodiments or aspects, property stitching server 114 determines geospatial data representing one or more secondary land parcels based on a plurality of buffers. The buffers are generated based on factors of the land parcel siting request. In some non-limiting embodiments or aspects, factors used to create the buffers are associated with the energy infrastructure proximity to the land parcel. In some non-limiting embodiments or aspects, energy infrastructure may include at least one or more of: crude oil rail transports, railroad transports, interstate exits, navigable rivers, primary airports, natural gas interstate pipelines, natural gas liquids pipelines, crude oil pipelines, power generating facilities, or electric substations.

Layer generation server 110 generates a buffered GIS layer that can be used to identify candidate land parcels. Layer generation server 110 generates a buffer around infrastructure that may provide proximity criteria based on the distance submitted by the user and/or land parcel siting interface 102. Multiple buffer rings may be created as map layers associated with differing proximity factors. Multiple buffer rings may also be created in a single map layer to provide with a lower score based on the importance associated with a particular factor and indicating a scale associated with the scoring system that relates to the hierarchy of importance. For example, if the user selects "4—Very Important", three additional buffer rings are created outside of the original buffer using a 10% incremental increase of the original distance cited. Each additional buffer ring receives a score of 20% less than the previous buffer ring.

The buffers may be overlaid by layer generation server 110 via various operations and/or aggregated to result in a single proximity criteria layer where a proximity score is calculated based on the amalgamation of overlapping buffer scores.

In some non-limiting embodiments or aspects, proximity factors include an importance factor, such that, for example, the importance factor may indicate: Not Important=On property or within 500 feet, within ½ Mile, within 1 Mile, within 3 Miles, within 5 Miles, within 10 Miles, not applicable; Important=Within 1 Mile, within 5 Miles, within 10 Miles, within 25 Miles, within 50 Miles, not applicable; Somewhat Important=Within ½ Mile, within 1 Mile, within 3 Miles, within 5 Miles, within 10 Miles, not applicable; 5 Critically Important=On property or within 500 feet, adjoins property or within 500 feet, within ½ Mile, within 1 Mile, within 3 Miles, within 5 Miles, within 10 Miles, within 25 Miles, within 50 Miles, not applicable.

In some non-limiting embodiments or aspects, one or more buffers are created by siting platform 104 (e.g., one or more computing devices of siting platform, etc.) to determine proximity of a land parcel to a required factor (e.g., a first proximity factor, a second proximity factor, etc.). The one or more buffers may be generated by the siting platform 104, or alternatively, may be generated by the layer generation server 110, for example, as or before the objective scores are being generated to decrease latency in the siting platform 104. In addition, the generation of multiple buffers increases the accuracy in the property stitching server 114 and eliminates a search cycle as an additional buffer decreases the secondary property options to reduce the number or types of requests to a database. Any number of buffers can be generated based on the requirements to focus the search and decrease the number of candidate land parcels for a secondary land parcel.

Siting platform 104 generates a first buffer that is geospatially located within the requested region and surrounding a first proximity factor by a first distance, wherein the first buffer indicates a land parcel is within the buffer is within at least a first distance of the first proximity factor.

Siting platform 104 generates a second buffer that is geospatially located within the requested region and surrounding a second proximity factor by a second distance of the land parcel request, wherein the second buffer indicates the land parcel, that is within the buffer, is within at least the second distance of the second proximity factor.

Layer generation server 110 generates an overlay for the requested region with the first buffer and the second buffer (e.g., or any number of buffers generated, etc.). The first buffer indicates a first weight and the second buffer indicates a second weight, and the overlay defines a proximity score for the land parcel of a geospatial area within the plurality of buffers (e.g., the first and second buffers in this case, etc.) based on the combination of the first buffer overlapping the second buffer.

Layer generation server 110 generates or determines a proximity score for a secondary land parcel based on a location of the primary site selection within a geospatial area of the plurality of buffers.

In some examples, additional buffers are required and used in addition to the first buffer to generate a proximity score. The additional buffers may include an incremental increase to the first distance or the second distance and/or are associated with an incremental decrease in the first weight from the first buffer.

In some non-limiting embodiments or aspects, layer generation server 110 generates one or more additional buffers based on an importance factor of the first proximity factor or the second proximity factor.

As shown in FIG. 4, at step 410, process 400 includes generating updated site selections with primary site selection and the one or more secondary site selections. For example, siting platform 104 generates updated site selections with primary site selection and the one or more secondary site selections. As an example, siting platform 104 generates updated site selections with primary site selection and the one or more secondary site selections.

In some non-limiting embodiments or aspects, siting platform 104 generates an updated site selection based on the at least one primary site selection, and at least one secondary site selection having a desired score (e.g., an objective score above a threshold, a proximity score above a threshold, etc.).

As described, property stitching server 114 first selects all properties that adjoin the parcel being reviewed by the tool. For example, property stitching server 114 determines secondary land parcels starting with the adjoining land parcel that has a current highest SiteLocator score. Property stitching server 114 reviews the parcel and/or determines if the parcel is suitable for development per the user's request. Property stitching server 114 analyzes or determines factors of the property to determine if the property would make an impact on the total size of the site based on its standalone acreage. For example, property stitching server 114 may ignore a property if it does not impact a siting selection (e.g., does not significantly impact a siting selection, etc.), such as, for example, 0.20 acres in size if the tool is searching for a property that needs to be at least 500 acres.

Alternatively, property stitching server 114 may determine the land parcel to be a suitable fit. If property stitching server 114 determines a suitable fit, the land parcel may be merged into a master land parcel (e.g., a final land parcel, an aggregated land parcel, a combined land parcel, etc.) and its size is added to the previous master land parcel.

Property stitching server 114 determines the combined size of the generated site of combined land parcels meet the requestor's minimum site size criteria. If the generated combined parcels now meet the size requirement as defined by the requestor, no further geospatial operations are needed. The map creation process is invoked.

When the combined parcels do not meet user requirements (e.g., the size requirement, land parcel restrictions, etc.) property stitching server 114 searches for another land parcel to combine (e.g., iterates through the next highest parcel touching the master parcel in a recursive manner until the total combined size falls within the requestor's size range, etc.). For example, property stitching server 114 determines multiple land parcel candidates to try in combination with a primary land parcel.

In some non-limiting embodiments or aspects, property stitching server 114 generates one GIS site polygon using the combined secondary land parcels to create the GIS site polygon. For example, property stitching server 114 determines geospatial coordinates. Property stitching server 114 sums land parcels using land parcel information. For example, the geospatial coordinates are combined to form a larger land parcel. Before summing, property stitching server 114 may eliminate land parcels that are not congruent. Property stitching server 114 may eliminate land parcels that are not adjacent, for example, property stitching server 114 may eliminate land parcels that do not have borders aligned (e.g., the borders have gaps, do not touch, etc.)

Property stitching server 114 may eliminate land parcels that are not within required features, and begin adjoining land parcels that have the highest ranking or weight, to add to the core property. In some non-limiting embodiments or aspects, siting platform 104 may abort the process based on the minimum size of the land parcels or land parcels are not adjoining (e.g., properly adjoining, etc.).

Property stitching server 114 generates a polygon's site response based on a final SiteLocator score, and additionally, adjusts to consider other scores for all the parcel property polygons that are included within the site, including proximity scores, land parcel type scores, land slope scores, and/or the like. When property stitching server 114 determines no further geospatial operations are needed, a map creation process is invoked for the land parcels of the site that has been found.

As shown in FIG. 4, at step 412, process 400 includes transmitting response data representing updated site selections. For example, siting platform 104 transmits response data representing updated site selections. As an example, siting platform 104 generates response data representing updated site selections satisfying a user's siting request that can be obtained or viewed. The siting platform 104 may invoke a map generation in either hardware or software. For example, siting platform 104 may generate or train a model to generate a map based on a land parcel.

Siting platform 104 transmits response data representing the updated site selection. Upon completion, one or more sites are created with or associating related parcel information (i.e., assessed value, owner, address, infrastructure, zoning, etc.) to the map output. For example, siting platform 104 displays computer generated land parcels determined to address a siting request. The computer-generated land parcels may be displayed to a user of the land parcel siting interface 102. For example, the computer-generated land parcels generated to fit a user's request, may be displayed as a layer of a map, where one or more candidate land parcels satisfy the requirements of a user and are selectable. For example, a computer-generated land parcel may include a selection capability or an information display function. Information may include a display of the subordinate land parcels that comprise the selectable land parcel.

Figure 5:
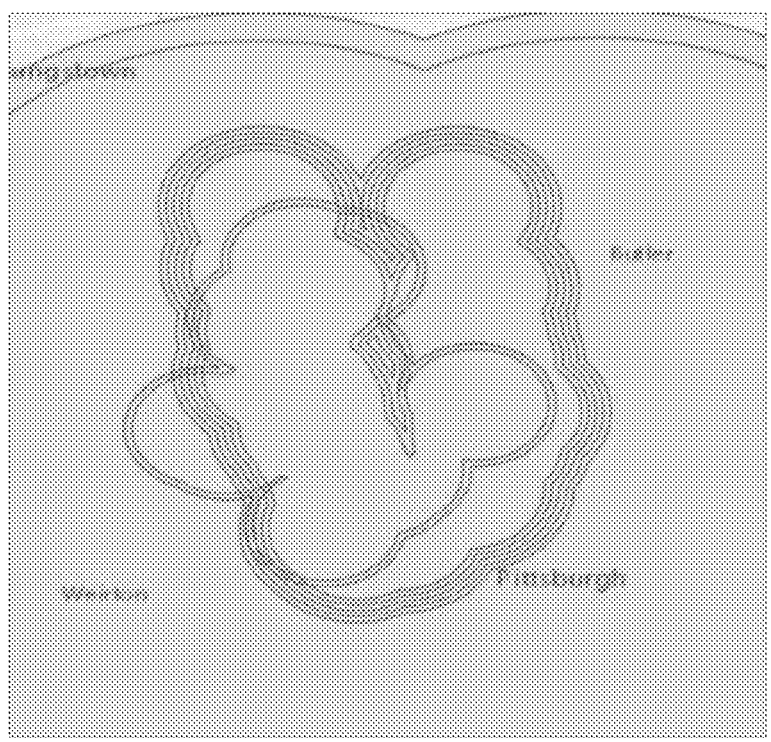
FIG. 5 is an illustration of a non-limiting embodiment or aspect of a buffer that is geospatially located within a requested region based on a site selection request.

Referring now to FIG. 5, FIG. 5 shows a non-limiting embodiment or aspect of an exemplary diagram of a set of amalgamated buffer layers that may be generated by the siting platform 104. The amalgamated buffer layers are associated with a score in each layer. The first layer having two buffer rings (e.g., contours, lines, etc.), the second layer having five buffer rings, and the third layer having two buffer rings. For example, the second layer having five buffer rings indicating a stretching of the buffer in a step down, such as, for example, a decline of 10% at five buffer rings may represent a proximity to an important pipeline. In this way, the score for that layer is maintained while it is reduced for land parcels that are increasingly further from the pipeline. Similarly, for the first and third buffer layers having two buffer rings each, that are of less importance, the step approach applies less levels, for example two buffer rings. The amalgamated buffer layers have the effect of increasing the accuracy of the computer or database used in performing the scoring of the land parcels. In addition, siting platform 104 applies scoring that can be determined through the amalgamated buffers with less memory, as only buffer layers are stored and applied to any candidate land parcel (e.g., an amalgamated buffer layer that can be generated and applied to all land parcels in a region, geospatial area, etc.) with increased computational efficiency.

With continuing reference to FIG. 5, a parcel that is geospatially located within a requested region and within the amalgamated buffer rings may obtain a high score, by reaching a maximum score for each buffer, while land parcels outside at least one of the high score buffer rings, may have a lower score, one of ordinary skill would understand that many scoring combinations are accurately and efficiently accounted for (e.g., faster search times within a database, smaller memory requirements for a database, more dynamic information filtering, more efficient information filtering, producing more accurate factor/land parcel synchronization, producing more realistic expressions of land parcels than have been created by human animators, etc.).

Figure 6:
FIG. 6 is an illustration of a non-limiting embodiment or aspect of secondary land parcels in a requested region that can be combined with a primary site.

Referring now to FIG. 6, FIG. 6 is an illustration of a non-limiting embodiment or aspect of secondary land parcels in a requested region that can be combined with a primary site. In some non-limiting embodiments or aspects, the siting platform 104 identifies three individual properties that meet the user's expectations. The siting platform 104 generates a new land parcel by stitching three land parcels to form a land parcel from the consolidated land parcels.

Figure 7:
FIG. 7 is an illustration of a non-limiting embodiment or aspect of a site selection generated based on the process of FIG. 4.

Referring now to FIG. 7, FIG. 7 is an illustration of a non-limiting embodiment or aspect of a site selection generated based on the process of FIG. 4. In some non-limiting embodiments or aspects, one or more of the elements of siting response interface 700 are generated and/or determined (e.g., completely, partially, etc.) by one or more devices of (e.g., one or more devices of a system of) land parcel siting interface 102 and/or siting platform 104. In some non-limiting embodiments or aspects, one or more of the elements of siting response interface 700 are performed, provided, or generated (e.g., completely, partially, etc.) by another device or a group of devices separate from or including siting platform 104, such as map generation system of siting platform 104 (e.g., one or more devices of siting platform 104, etc.). Interface 700 includes site size score 702, earthwork score 704, zoning score 706, proximity score 708. The scores can be used to generate an overarching score, such as objective score or, alternatively, SiteLocator score 710, in one example, having a score of 77, an objective score created to evaluate a property having the five properties listed in FIG. 7. The generated property includes five land parcels. The land parcels are stitched together to generate the example land parcel.

In some non-limiting embodiments or aspects, siting data representing one or more siting locations determined to satisfy the users siting request in a geographic area are displayed on a graphical map (e.g., a layer on a graphical map, etc.). The geographic area encompasses a predefined geographical region established based on the user's request. A user selects a siting location of interest within the geographical region. The location of interest has a corresponding geographical location (e.g., geographic coordinates, etc.). The graphical map is created in a manner such that it includes, and optionally, may be centered on (e.g., includes the surroundings, a range of surroundings, etc.), the geographical location of the user-selected siting location of interest or a combination of locations of interest. The graphical map may be a 3D graphical map which may be rotated around, or zoomed toward or away from, the user-selected siting location of interest. The view angle with respect to the ground plane may also be adjusted while maintaining focus on the location of interest. Other objects in the geographic area may be included in the display automatically, or alternatively based on a user selection, predefined parameters, hovering or entering a location in the map, and/or the like. A user may change a start geographical location and may further refine the geographical location size, shape, color, geographical pose, and a 3D animated flythrough graphical map may be created and displayed beginning at a point in the geographical area. For example, a plurality of suggested site locations may be displayed at one time and by navigating in the geographical area may be selected one at a time, or in combinations of the suggested site locations, wherein the siting data is continuously displayed during the 3D flythrough, or alternatively, displayed as a flythrough touches at least a part of a suggested siting location. The required locations, such as important infrastructure and roadways may be viewed simultaneously. The flythrough may be stopped at a point to determine new siting data while continuously displaying the siting request data, even though the flythrough has stopped.

In some non-limiting embodiments or aspects, siting request data is displayed on a graphical map that further includes a map of a road system, energy infrastructure, facilities, information associated with transmission pipelines and facilities, and/or the like. The graphical map displays one or more regions, one or more layers, and the energy infrastructure data represents energy capabilities in the surrounding geographic area. A status of each property, pipeline, facility, and/or the like on the graphical map is displayed based on energy infrastructure data. For example, information associated with pipelines and facilities related to the transportation of refined products in North America may be included in the display, or alternatively, may be included if associated with the siting request. The status may correspond to the energy infrastructure data associated with that geographical area (e.g., within a range of the suggested site location, within a specified range, within a predetermined association of the geographical area, etc.). An animated map of the infrastructure system is created by combining the graphical map, a map of the infrastructure or facility, and the status of each energy infrastructure. The animated energy flow map is created by being continuously rendered in real time. The energy infrastructure data is updated in real-time such that the siting request map immediately displays (e.g., reflects, etc.) updated infrastructure data, or any important updated aspects (e.g., transmission, gathering, processing, distribution, etc.) that may not be shown simply in the data.

Referring now to FIGS. 8A-8D, FIGS. 8A-8D are diagrams of an overview of a non-limiting embodiment of an implementation 800 relating to one or more processes disclosed herein. In some non-limiting embodiments or aspects, one or more of the steps of implementation 800 are performed (e.g., completely, partially, etc.) by land parcel siting interface 102 (e.g., a mobile device displaying land parcel siting interface 102, etc.), one or more steps of implementation 800 are performed (e.g., completely, partially, etc.) by data stores 106 (e.g., one or more computing devices operating data stores 106, etc.) or more of the steps of process 800 are performed (e.g., completely, partially, etc.) by siting platform 104 (e.g., one or more processors of a layer generation server 110, one or more processors of a land parcel search server 112, one or more processors of a property stitching server 114, etc.). In some non-limiting embodiments or aspects, one or more of the steps of implementation 800 are performed (e.g., completely, partially, etc.) by another device or a group of devices separate from or including land parcel siting interface 102, such as one or more devices of (e.g., one or more devices of a system of) a region database 108.

Figure 8A:
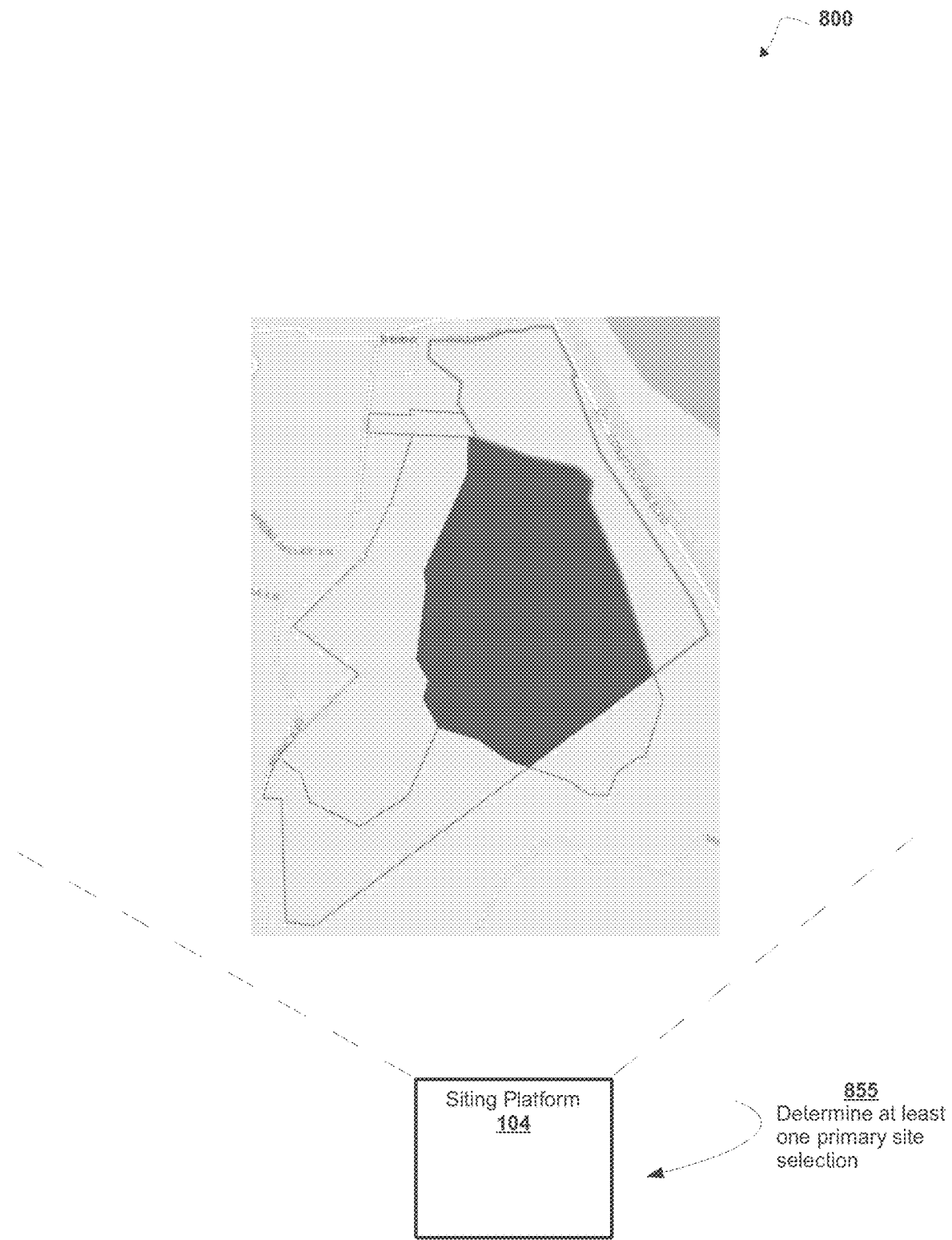
FIGS. 8A-8D are diagrams of an implementation of one or more processes disclosed herein.

As shown by reference number 855 in FIG. 8A, siting platform 104 determines at least one primary site selection. For example, siting platform 104 obtains and provides GIS data for a land parcel under review which does not meet the minimum size as defined by the user (e.g., in a land siting request, in land parcel siting interface 102, etc.). For example, the adjoining properties are selected. The property or land parcels with the highest SiteLocator score are examined first to determine a base, for example the land parcel highlighted in the center of the map is analyzed first since it has the highest SiteLocator score, while searching for additional land parcels to be merged into the proposed site. However, siting platform determines the total site size is still under the requestor's threshold.

Figure 8B:
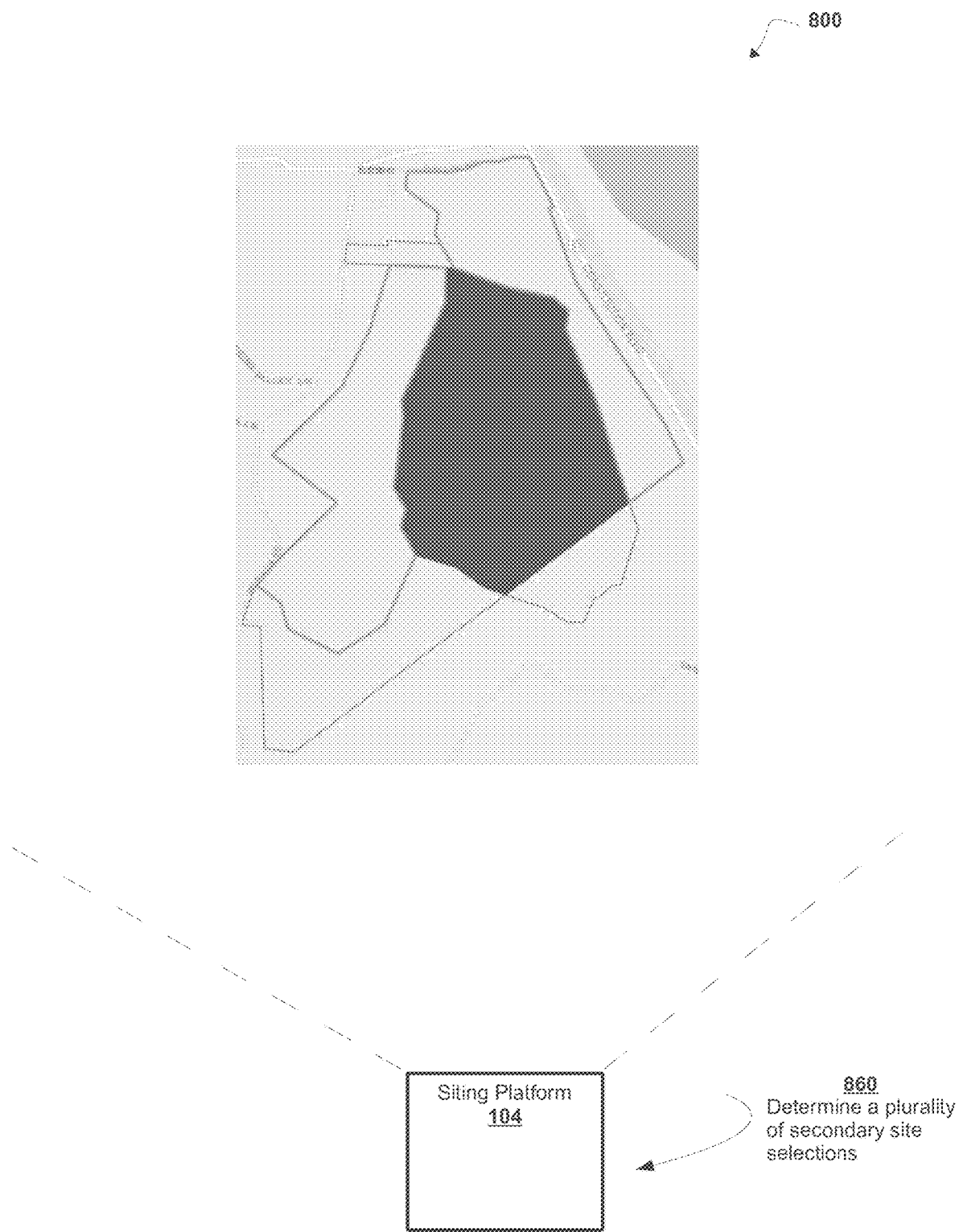

As shown by reference number 860 in FIG. 8B, siting platform 104 determines a plurality of secondary site selections. The property to the west has the next highest SiteLocator score. It is reviewed and will be merged into the site. The total site size is still under the requestor's threshold.

Figure 8C:
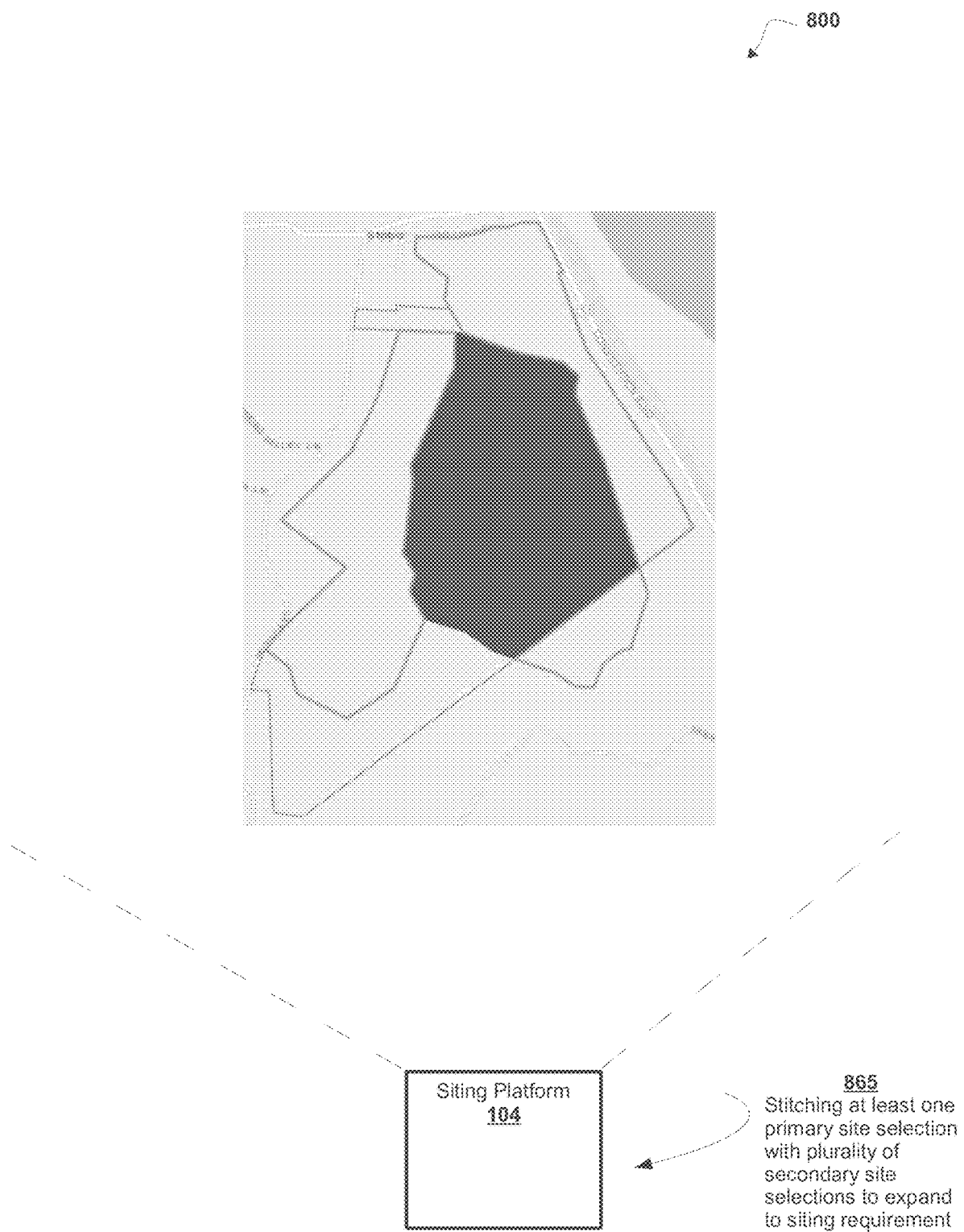

As shown by reference number 865 in FIG. 8C, siting platform 104 generates a new land parcel by stitching a land parcel, for example, at least one primary site selection with plurality of secondary site selections to expand to siting requirement. The property to the south has the next highest SiteLocator score. It is reviewed and will be merged into the site. The total site size now meets the requestor's threshold.

Figure 8D:

As shown by reference number 870 in FIG. 8D, siting platform 104 generates the siting map including updated site selection with secondary site selections. For example, the generated land parcel site, made up of four properties, meets the requestor's criteria. The two properties with lower SiteLocator scores do not need to be reviewed and are omitted by the tool.

In this description, some functions and operations are described as being performed by or caused by software code to simplify description. However, such expressions are also used to specify that the functions result from execution of the code/instructions by a processor, such as a microprocessor.

Alternatively or in combination, the functions and operations as described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache, or a remote storage device.

Routines executed to implement the embodiments may be implemented as part of an operating system or a specific application, component, program, object, module, or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine-readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, ROM, RAM, flash memory devices, floppy and other removable disks, magnetic disk storage media, optical storage media (e.g., compact disk read-only memory (CD ROMS), digital versatile disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer-implemented method comprising:
providing a sitting interface, by a siting system comprising one or more processors, the sitting interface including a plurality of selectable proximity factors for generating a new land parcel within a requested region, for land development siting from one or more selectable proximity factors;
determining, with the one or more processors, at least one primary land parcel for a primary site selection which includes a land parcel size below a requested sizing threshold based on information received from a geographical information system (GIS), the GIS information including land parcel data defining a plurality of land parcels and energy data defining a plurality of energy infrastructures in at least one of the plurality of land parcels;
activating a request for one or more secondary site selections to fulfill the primary site selection sizing requirement automatically determining, with the one or more processors, a siting buffer of the primary land parcel that indicates a secondary site selection within proximity of an energy infrastructure of the plurality of energy infrastructures, the siting buffer adapted to include a number of buffer rings, each comprising a proximity score, based on an importance factor of the energy infrastructure, the proximity score, based on least a part of an objective score associated with features of the plurality of land parcels based on at least one of a size, a type, a slope, or a proximity of a land parcel;
and
providing a land parcel scoring interface, by a mobile device, representing a new site selection response based on scores adapted from the siting buffer to stitch the at least one primary land parcel to at least one secondary land parcel, wherein a site selection response with the at least one secondary land parcel within a preferred proximity is not in a first ring of the siting buffer, and in response, the new site selection response is generated to include the at least one secondary land parcel based on the importance factor of the siting buffer.

2. The computer-implemented method of claim 1, wherein determining geospatial data representing at least one secondary land parcel, further comprises generating a plurality of buffers by:
generating a first buffer that is geospatially located within the requested region and surrounding a first proximity factor by a first distance, wherein the first buffer indicates a land parcel that is within the buffer is within at least the first distance of the first proximity factor;
generating a second buffer that is geospatially located within the requested region and surrounding a second proximity factor by a second distance of a land parcel request of the siting interface, wherein the second buffer indicates the land parcel that is within the buffer is within at least the second distance of the second proximity factor;
generating an overlay for the requested region with the first buffer and the second buffer, wherein the first buffer indicates a first weight and the second buffer indicates a second weight, and the overlay defines a proximity score for the land parcel of a geospatial area within the plurality of buffers based on the combination of the first buffer overlapping the second buffer; and
determining a proximity score for a secondary land parcel based on a location of the primary site selection within the geospatial area of the plurality of buffers.

3. The computer-implemented method of claim 2, wherein one or more additional buffers are generated based on an importance factor of the first proximity factor or the second proximity factor.

4. The computer-implemented method of claim 3, wherein the additional buffers are in addition to the first buffer, and wherein the additional buffers include an incremental increase to the first distance or the second distance and are associated with an incremental decrease in the first weight from the first buffer.

5. The computer-implemented method of claim 4, wherein the first proximity factor is used to generate a proximity score by determining distances between the land parcel and a publicly accessible destination.

6. The computer-implemented method of claim 5, wherein the importance factor associated with a proximity factor is defined by a numeric scale, a word scale, or other indicator associated with assigning incremental weights to the proximity factor.

7. The computer-implemented method of claim 6, wherein the importance factor associated with the proximity factor comprises a level, wherein the level includes one of: critically important, very important, important, not important, or not applicable, and additional buffers are created based on the level of the importance factor.

8. The computer-implemented method of claim 1, wherein a first land parcel proximity score is assigned to each parcel utilizing an overlay and attribute information as stored therein.

9. The computer-implemented method of claim 1, wherein the energy infrastructures include at least one or more of: crude oil rail transports, railroad transports, interstate exits, navigable rivers, primary airports, natural gas interstate pipelines, natural gas liquids pipelines, crude oil pipelines, power generating facilities, or electric substations.

10. The computer-implemented method of claim 1, wherein an objective score further comprises at least one of:
   a land parcel size score determined by correlating the land parcel size with a site size of a land parcel request of the siting interface, wherein a high score is assigned to a land parcel having the land parcel size within an area range of the land parcel request, and lower scores are determined based on how far the land parcel size falls outside a size range;
   a land parcel type score determined by correlating a land parcel type with a site type of the land parcel request, wherein the high score is assigned to a land parcel having a land parcel type matching the site type of the land parcel request and the lower score is determined and assigned based on land parcel types that fall outside the size range; or
   a land parcel slope score determined by correlating a maximum percent slope determined for a land parcel from a GIS slope layer with a site slope from the land parcel request, wherein a high score is assigned for the land parcel having a maximum percent slope determined for the land parcel equal to or less than the site slope of the land parcel request, and a lower score is determined for a land parcel having a percent slope higher than the site slope of the land parcel request.

11. The computer-implemented method of claim 1, wherein an objective score comprises a final score for the new site selection response based on at least one of the land parcel size, type, slope, or proximity.

12. A computing system comprising:
   one or more processors programmed or configured to:
   provide a siting interface, the siting interface including a plurality of selectable proximity factors generating a new land parcel within a requested region for land development siting from one or more selectable proximity factors;
   determine at least one primary land parcel for a primary site selection which includes a land parcel size below a requested sizing threshold based on information received from a geographical information system (GIS), the GIS information including land parcel data defining a plurality of land parcels and energy data defining a plurality of energy infrastructures in at least one of the plurality of land parcels;
   activate a request, for one or more secondary site selections to fulfill a sizing requirement of the primary site selection, automatically determines a siting buffer of the primary land parcel that indicates one or more secondary site selections within proximity of an energy infrastructure of the plurality of energy infrastructures, the siting buffer adapted to include a number of buffer rings, each comprising a proximity score, based on an importance factor of the energy infrastructure, the proximity score forming at least a part of an objective score associated with features of the plurality of land parcels based on at least one of a size, a type, a slope, or a proximity of a land parcel;
   and
   provide a land parcel scoring interface representing a new site selection response based on scores adapted from the siting buffer to stitch the at least one primary land parcel to at least one secondary land parcel, wherein a site selection response with the at least one secondary land parcel within a preferred proximity is not in a first ring of the siting buffer, and in response, the new site selection response is generated to include the at least one secondary land parcel based on the importance factor of the siting buffer.

13. The computing system of claim 12, wherein determining geospatial data representing one or more secondary land parcels, further comprises generating a plurality of buffers by:
   generating a first buffer that is geospatially located within the requested region and surrounding a first proximity factor by a first distance, wherein the first buffer indicates a land parcel that is within the buffer is within at least the first distance of the first proximity factor;
   generating a second buffer that is geospatially located within the requested region and surrounding a second proximity factor by a second distance of a land parcel request of the siting interface, wherein the second buffer indicates the land parcel is within the buffer is within at least the second distance of the second proximity factor;
   generating an overlay for the requested region with the first buffer and the second buffer, wherein the first buffer indicates a first weight and the second buffer indicates a second weight, and the overlay defines a proximity score for the land parcel of a geospatial area within the plurality of buffers based on the combination of the first buffer overlapping the second buffer; and
   determining a proximity score for a secondary land based on a location of the primary site selection within a geospatial area of the plurality of buffers.

14. The computing system of claim 13, wherein one or more additional buffers are generated based on an importance factor of the first proximity factor or the second proximity factor.

15. The computing system of claim 14, wherein the additional buffers are in addition to the first buffer, and wherein the additional buffers include an incremental increase to the first distance or the second distance and are associated with an incremental decrease in the first weight from the first buffer.

16. The computing system of claim 15, wherein the first proximity factor is used to generate the proximity score by determining distances between the land parcel and a publicly accessible destination.

17. The computing system of claim 16, wherein the importance factor associated with the first proximity factor is defined by a numeric scale, a word scale, or other indicators assigning incremental weights to the first proximity factor.

18. The computing system of claim 17, wherein the importance factor associated with the proximity factor comprises a level, wherein the level includes one of: critically important, very important, important, not important, or not applicable, and additional buffers are created based on the level of the importance factor.

19. The computing system of claim 18, wherein a first land parcel proximity score is assigned to each parcel utilizing an overlay and attribute information as stored therein, wherein the energy infrastructures include at least one or more of: crude oil rail transports, railroad transports, interstate exits, navigable rivers, primary airports, natural gas interstate pipelines, natural gas liquids pipelines, crude oil pipelines, power generating facilities, or electric substations; and an objective score further comprises at least one of:

a land parcel size score determined by correlating a land parcel size with a site size of the land parcel request, wherein a high score is assigned to the land parcel having the land parcel size within an area range of the land parcel request, and lower scores are determined based on how far the land parcel size falls outside a size range;

a land parcel type score determined by correlating the land parcel size with site type of the land parcel request, wherein the high score is assigned to the land parcel having a land parcel type matching a site type of the land parcel request and a lower score is determined and assigned based on land parcel types that fall outside a size range; or a land parcel slope score determined by correlating a maximum percent slope determined for the land parcel from a GIS slope layer with a site slope from the land parcel request, wherein the high score is assigned for the land parcel having the maximum percent slope determined for the land parcel equal to or less than the site slope of the land parcel request, and a lower score is determined for the land parcel having a percent slope higher than the site slope of the land parcel request.

20. A computer program product comprising at least one non-transitory computer-readable medium including one or more instructions that, when executed by at least one processor, cause the at least one processor to:

provide a siting interface, the siting interface including a plurality of selectable proximity factors for generating a new land parcel within a requested region for land development siting from one or more selectable proximity factors;

determine at least one primary land parcel for a primary site selection which includes a land parcel size below a requested sizing threshold based on information received from a geographical information system (GIS), the GIS information including land parcel data defining a plurality of land parcels and energy data defining a plurality of energy infrastructures in at least one of the plurality of land parcels;

activate a request, for one or more secondary site selections to fulfill a sizing requirement of the the primary site selection, which automatically determines a siting buffer of the primary land parcel that indicates or more secondary site selections within proximity of an energy infrastructure of the plurality of energy infrastructures, the siting buffer adapted to include a number of buffer rings, which comprising a proximity score, based on an importance factor of the energy infrastructure, the proximity score forming at least a part of an objective score associated with features of the plurality of land parcels based on at least one of a size, a type, a slope, or a proximity of land parcel;

and provide a land parcel scoring interface representing a new site selection response based on scores adapted from the siting buffer to stitch the at least one primary land parcel to at least one secondary land parcel, and wherein a site selection response with the at least one secondary land parcel within a preferred proximity is not in a first ring of the siting buffer, and in response, the new site selection is generated to include the at least one secondary land parcel based on the importance factor of the siting buffer.

* * * * *

UNITED STATES PATENT AND TRADEMARK OFFICE
CERTIFICATE OF CORRECTION

PATENT NO. : 11,704,758 B2  
APPLICATION NO. : 17/011022  
DATED : July 18, 2023  
INVENTOR(S) : Jurick et al.

Page 1 of 1

It is certified that error appears in the above-identified patent and that said Letters Patent is hereby corrected as shown below:

In the Claims

Column 31, Line 59, Claim 1, delete "sitting" and insert -- siting --

Column 31, Line 60, Claim 1, delete "sitting" and insert -- siting --

Column 32, Line 10, Claim 1, delete "requirement" and insert -- requirement by --

Column 32, Line 17, Claim 1, delete "score, based on" and insert -- score forming at --

Column 32, Line 36, Claim 2, delete "at" and insert -- the at --

Column 33, Line 61, Claim 12, delete "factors" and insert -- factors for --

Column 34, Line 8, Claim 12, delete "automatically" and insert -- which automatically --

Column 35, Line 34, Claim 19, delete "with" and insert -- with a --

Column 36, Line 24, Claim 20, delete "or" and insert -- one or --

Column 36, Line 28, Claim 20, delete "which" and insert -- each --

Column 36, Line 33, Claim 20, delete "of" and insert -- of a --

Signed and Sealed this  
Twenty-sixth Day of September, 2023

Katherine Kelly Vidal  
*Director of the United States Patent and Trademark Office*